(12) United States Patent
Kimura

(10) Patent No.: US 7,515,353 B2
(45) Date of Patent: Apr. 7, 2009

(54) ZOOM LENS SYSTEM AND CAMERA INCLUDING ZOOM LENS SYSTEM

(75) Inventor: Tomonori Kimura, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/032,967

(22) Filed: Feb. 18, 2008

(65) Prior Publication Data

US 2008/0198476 A1   Aug. 21, 2008

(30) Foreign Application Priority Data

Feb. 19, 2007   (JP) .............................. 2007-037816

(51) Int. Cl.
*G02B 15/14* (2006.01)

(52) U.S. Cl. ...................... 359/689; 359/686

(58) Field of Classification Search .......... 359/686–690
See application file for complete search history.

(56) References Cited

U.S. PATENT DOCUMENTS

| | | | |
|---|---|---|---|
| 5,963,378 A | 10/1999 | Tochigi | |
| 6,166,864 A | 12/2000 | Horiuchi | |
| 6,867,925 B1 | 3/2005 | Sato | |
| 6,975,461 B2 | 12/2005 | Eguchi | |
| 7,193,787 B2 | 3/2007 | Horiuchi | |
| 2006/0062569 A1 | 3/2006 | Sato | |
| 2006/0127075 A1 | 6/2006 | Minakata | |

FOREIGN PATENT DOCUMENTS

| | | |
|---|---|---|
| JP | 7-270684 | 10/1995 |
| JP | 11-305124 | 11/1999 |
| JP | 2000-347102 | 12/2000 |
| JP | 2001-66717 | 3/2001 |
| JP | 2003-315676 | 11/2003 |
| JP | 2005-148430 | 6/2005 |
| JP | 2005-215518 | 8/2005 |
| JP | 2006-84887 | 10/2007 |

*Primary Examiner*—Darryl J Collins
(74) *Attorney, Agent, or Firm*—Canon USA, Inc. IP Div.

(57) ABSTRACT

A zoom lens system includes, in order from an object side to an image side, a first lens unit having a positive optical power, a second lens unit having a negative optical power, and a rear lens component including at least one lens unit. When zooming is performed, the second lens unit is movable so that a distance between the first lens unit and the second lens unit at a telephoto end is greater than that at a wide-angle end. The second lens unit includes a negative lens element made of a material having a high index of refraction and satisfying predetermined conditions.

15 Claims, 33 Drawing Sheets

ZOOM LENS SYSTEM AND CAMERA INCLUDING ZOOM LENS SYSTEM

BACKGROUND OF THE INVENTION

1. Field of the Invention

The present invention relates to a zoom lens system and a camera including the zoom lens system.

2. Description of the Related Art

In recent years, image pickup apparatuses including a solid-state image pickup element, such as video cameras, digital still cameras, broadcast cameras, and security cameras, and silver-halide film cameras have been functionally advanced. In addition, the sizes of the image pickup apparatuses have been decreased.

Accordingly, imaging optical systems (zoom lenses) used in such image pickup apparatuses are required to have a short lens length, a small size, a high zoom ratio, and a high resolution.

To satisfy these requirements, a zoom lens of a rear focusing type has been developed. A zoom lens of a rear focusing type includes a first lens unit disposed closest to an object and other lens units. By moving the other lens units, focusing is performed.

One type of a zoom lens of a rear focusing type is a four-unit zoom lens including a first lens unit having a positive refractive power, a second lens unit having a negative refractive power, a third lens unit having a positive refractive power, and a fourth lens unit having a positive refractive power in this order from an object side to an image side.

Among these zoom lenses, some zoom lenses move the second lens unit so as to vary magnification. In addition, the zoom lenses move the fourth lens unit so as to compensate for an image plane variation caused by the magnification (refer to, for example, Japanese Patent Laid-Open Nos. 7-270684 (corresponding to U.S. Pat. No. 5,963,378), 11-305124 (corresponding to U.S. Pat. No. 6,166,864), and 2005-215518 (corresponding to U.S. Pat. No. 7,193,787)). In such zoom lenses, only two lens units are movable. Accordingly, the zoom lenses are achieved by using a relatively simple driving mechanism.

In contrast, some zoom lenses move all of the four lens units when zooming is performed (refer to, for example, Japanese Patent Laid-Open Nos. 2000-347102 (corresponding to U.S. Pat. No. 6,867,925) and 2003-315676 (corresponding to U.S. Pat. No. 6,975,461)).

Such zoom lenses can control the sensitivity to the eccentricity of each of the lens units. Accordingly, the zoom lenses are suitable for image pickup apparatuses of a collapsible mount type in which the lens units are collapsed when the image pickup apparatuses are not in use so that the image pickup apparatuses are easy to carry.

On the other hand, in recent years, light transmissive ceramics have been developed, and therefore, lens apparatuses using such light transmissive ceramics for the optical material thereof have been developed.

Light transmissive ceramics have an index of refraction higher than that of optical glass. In addition, light transmissive ceramics have excellent hardness and strength. By using such properties of light transmissive ceramics, an optical system having a reduced thickness of an entire lens system has been developed (refer to, for example, Japanese Patent Laid-Open No. 2006-84887 (corresponding to U.S. Pat. No. 2006/0062569)).

In recent years, a zoom lens used for image pickup apparatuses are strongly required to have a high zoom ratio and a small size of the entire lens system.

In general, by reducing the number of lenses of a zoom lens while increasing the index of refraction of each of the lens units, the size of the zoom lens can be reduced.

However, for such a zoom lens, the thickness of a lens tends to increase. Accordingly, the lens system is not satisfactorily reduced. In addition, it is difficult to correct a variety of aberrations of the lenses.

To obtain a high zoom ratio and a small size for the entire lens system, it is important to determine the zoom type, the index of refraction of each of the lens units, and a combination of lens elements in each of the lens units in an optimal manner.

In particular, for the above-described zoom lenses of a rear focusing type, it is important to optimally design the structure of the second lens unit used for primarily varying magnification.

For example, for lenses in the second lens unit, a material that can reduce a variety of aberrations including a chromatic aberration at any zoom position needs to be selected in consideration of the indices of refraction and the Abbe numbers.

The lens apparatus described in Japanese Patent Laid-Open No. 2006-84887 includes a cemented lens having a positive lens element and a negative lens element bonded to each other. A material of the negative lens element is a light transmissive ceramic. In this way, the thickness of the cemented lens is reduced, and therefore, the size of the lens apparatus is reduced.

Ceramics have an index of refraction, hardness, and bending strength higher than those of glass. In Japanese Patent Laid-Open No. 2006-84887, using these properties of ceramic, the size of the lens apparatus can be advantageously reduced by an amount of reduction in the thickness of one negative lens element.

Consider a graph having the ordinate representing an index of refraction increasing upward and the abscissa representing the Abbe number increasing towards the left (hereinafter referred to as an "nd-vd diagram"). In general, when glass is mapped on the graph, the property of the glass distributes along one of several straight lines.

In general, as the index of optical glass increases, the Abbe number of the optical glass decreases and the dispersion increases.

In the nd-vd diagram, some ceramics, single-crystalline oxide materials, and polycrystalline oxide materials having a high light transmission in the visible light range have a relationship between the index of refraction and the Abbe number different from the relationship of a normal optical glass.

That is, these materials have an index of refraction higher than that of optical glass having the same Abbe number.

When a ceramic having such property is used for an optical material, aberrations can be easily corrected and the size of the entire lens system can be easily reduced.

However, even if a lens made of a ceramic is simply used for a zoom lens, it is difficult to obtain a high optical performance for the entire zoom range.

To increase a zoom ratio and reduce the size of the entire lens system, it is important to determine the zoom type, the index of refraction of each of the lens units, and a combination of lens elements in each of the lens units in an optimal manner.

SUMMARY OF THE INVENTION

The present invention is directed to a compact zoom lens system having a high zoom ratio and a high optical performance over an entire zoom range by appropriately using a material having a high index of refraction, such as a light-transmissive ceramic.

According to the present invention, the zoom lens system can be suitably used for image pickup apparatuses including a solid-state image pickup element, such as video cameras, digital still cameras, broadcast cameras, or security cameras, and image pickup apparatuses using a silver-halide film, such as silver-halide film cameras.

According to an aspect of the present invention, a zoom lens system includes, in order from an object side to an image side, a first lens unit having a positive optical power, a second lens unit having a negative optical power, and a rear lens component including at least one lens unit. When zooming is performed, the second lens unit is movable so that a distance between the first lens unit and the second lens unit at a telephoto end is greater than that at a wide-angle end. The second lens unit includes a negative lens element made of a material satisfying the following conditions:

$$Nd > 2.3 - 0.01 \cdot vd, \text{ and}$$

$$1.75 < Nd < 2.7,$$

where Nd is the index of refraction of the material for the d-line, and vd is the Abbe number of the material.

Further features of the present invention will become apparent from the following description of exemplary embodiments with reference to the attached drawings.

DESCRIPTION OF THE EMBODIMENTS

Zoom lens systems and an image pickup apparatus including one of the zoom lens systems according to exemplary embodiments of the present invention are described below.

A zoom lens according to each of the embodiments includes, in order from an object side to an image side, a first lens unit having a positive refractive power (i.e., optical power=inverse of a focal length), a second lens unit having a negative refractive power, and a rear component including at least one lens unit. When zooming is performed, at least the second lens unit is moved so that the distance between the first lens unit and the second lens unit at a telephoto end is greater than that at a wide-angle end.

In addition, the rear component includes at least one lens unit having a positive refractive power.

For example, the rear component includes a third lens unit having a positive refractive power and a fourth lens unit having a positive refractive power in this order from an object side to an image side.

Figure 1:
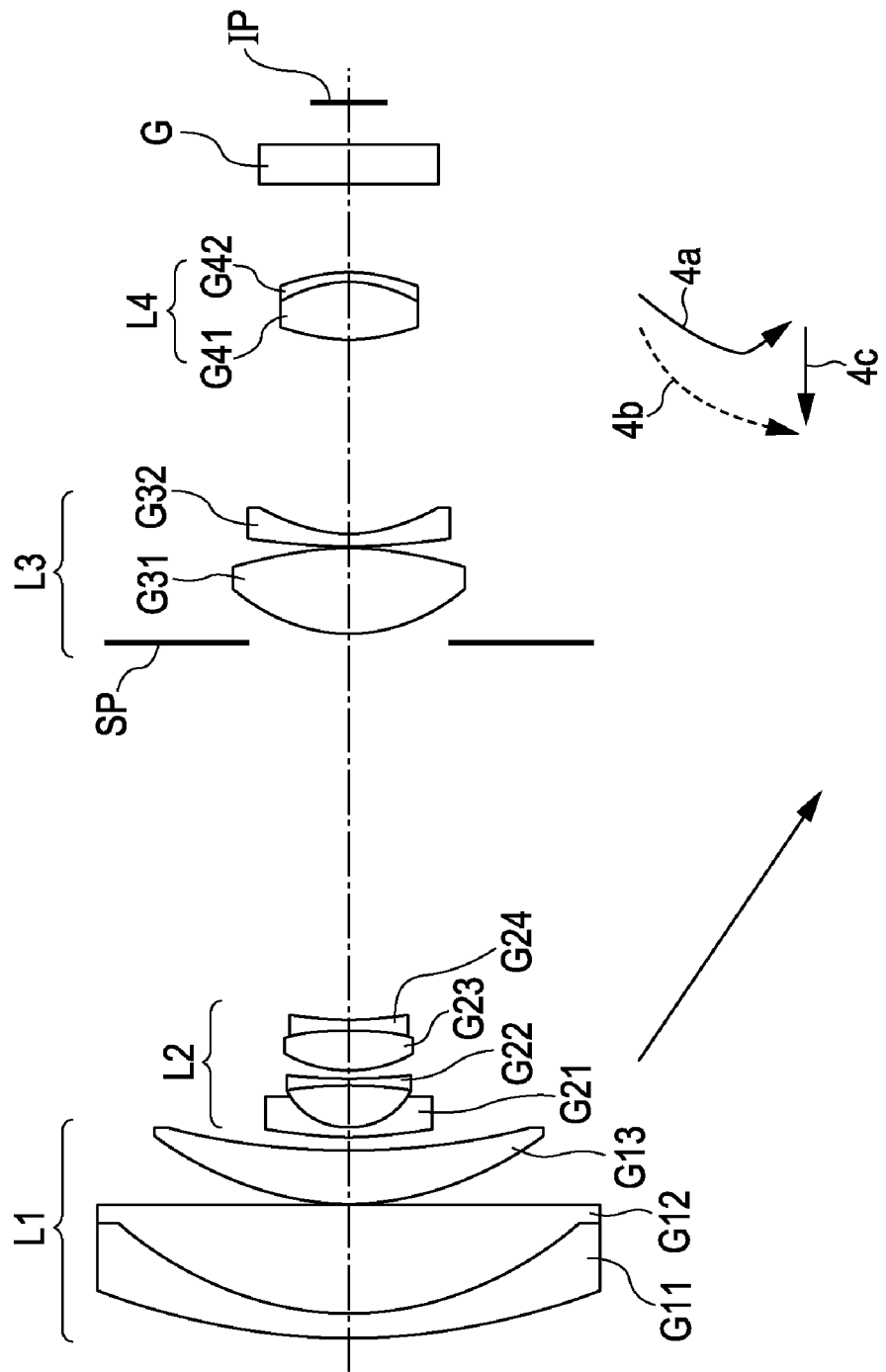
FIG. 1 is a cross-sectional view of a zoom lens at a wide-angle end according to a first embodiment of the present invention.
Figure 2:
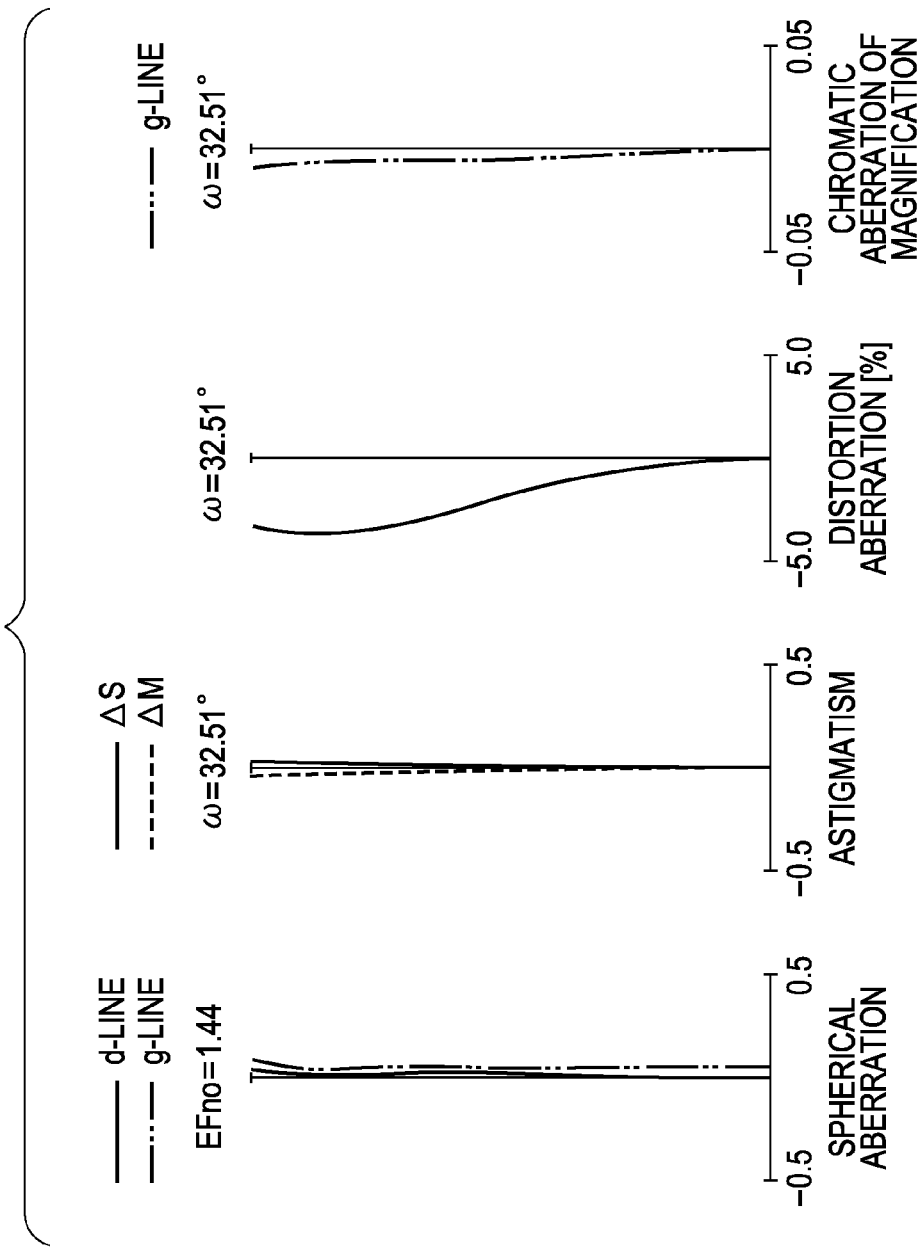
FIG. 2 is an aberration diagram of the zoom lens at a wide-angle end according to the first embodiment.
Figure 3:
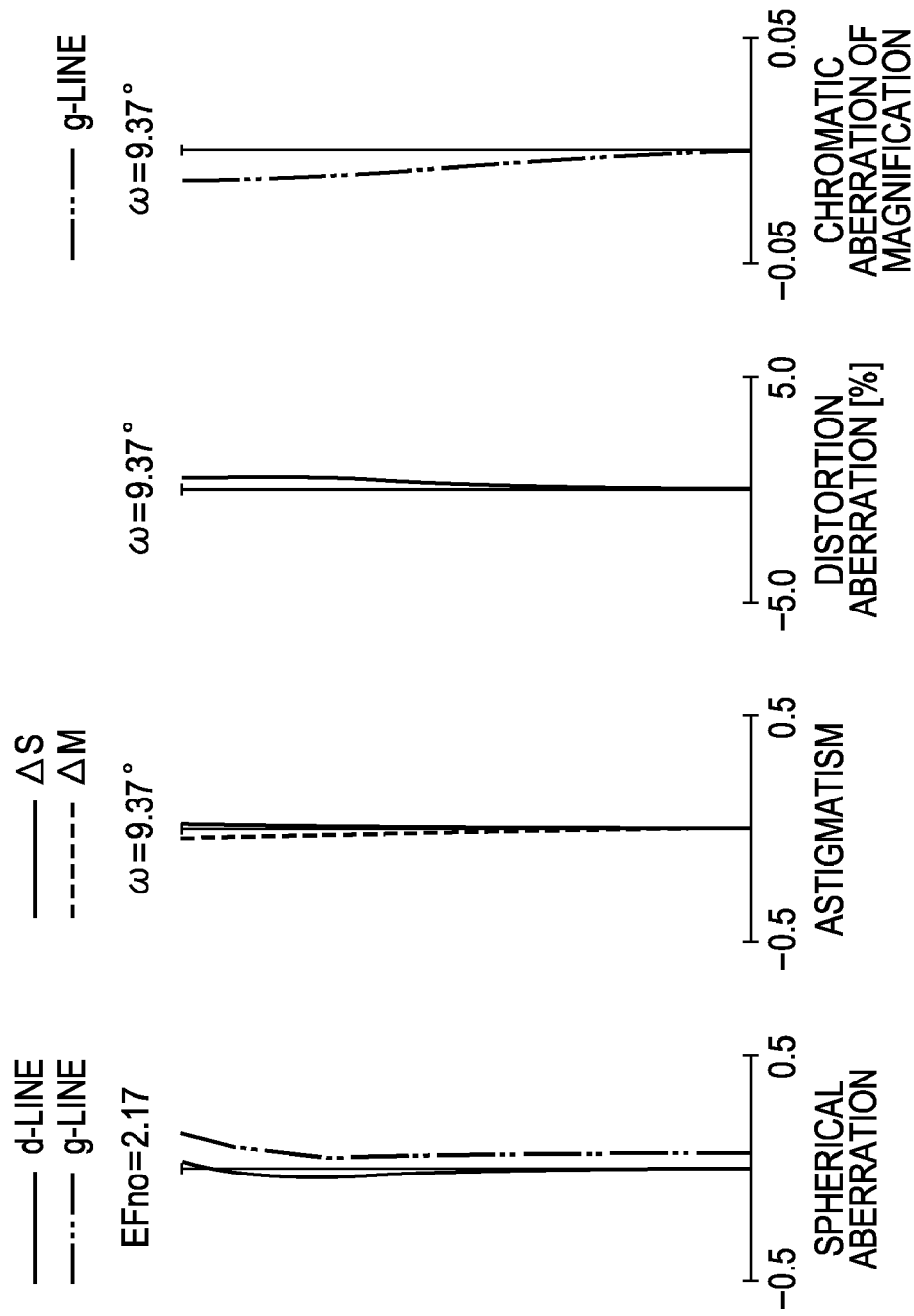
FIG. 3 is an aberration diagram of the zoom lens at a middle zoom position according to the first embodiment.
Figure 4:
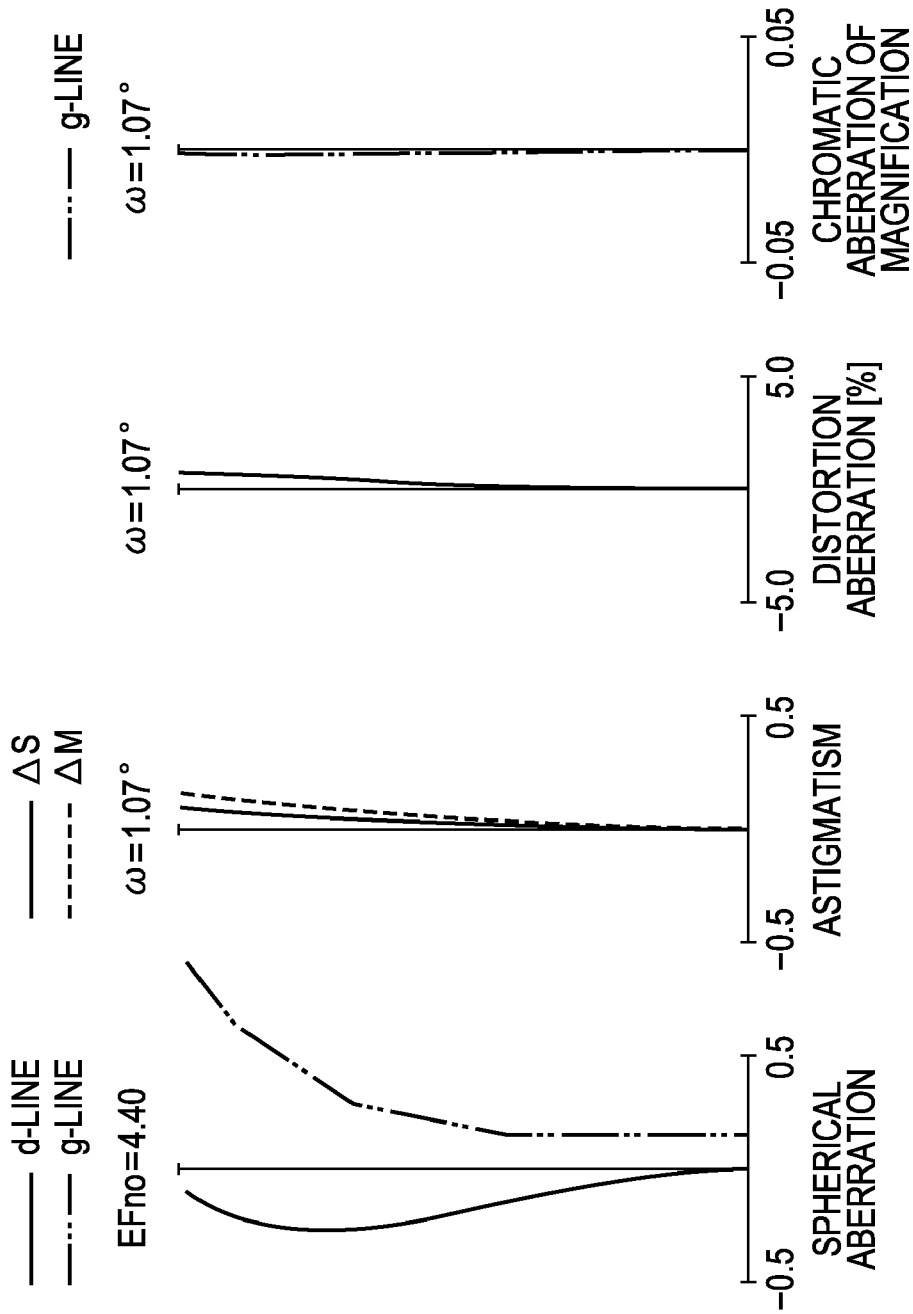
FIG. 4 is an aberration diagram of the zoom lens at a telephoto end according to the first embodiment.

FIG. 1 is a cross-sectional view of a main portion of the zoom lens at a wide-angle end according to a first embodiment. FIGS. 2, 3, and 4 are aberration diagrams of the zoom lens according to the first embodiment at a wide-angle end (a minimum focal length end), a middle focal length position (a middle zoom position), and a telephoto end (a maximum focal length end), respectively.

Figure 5:
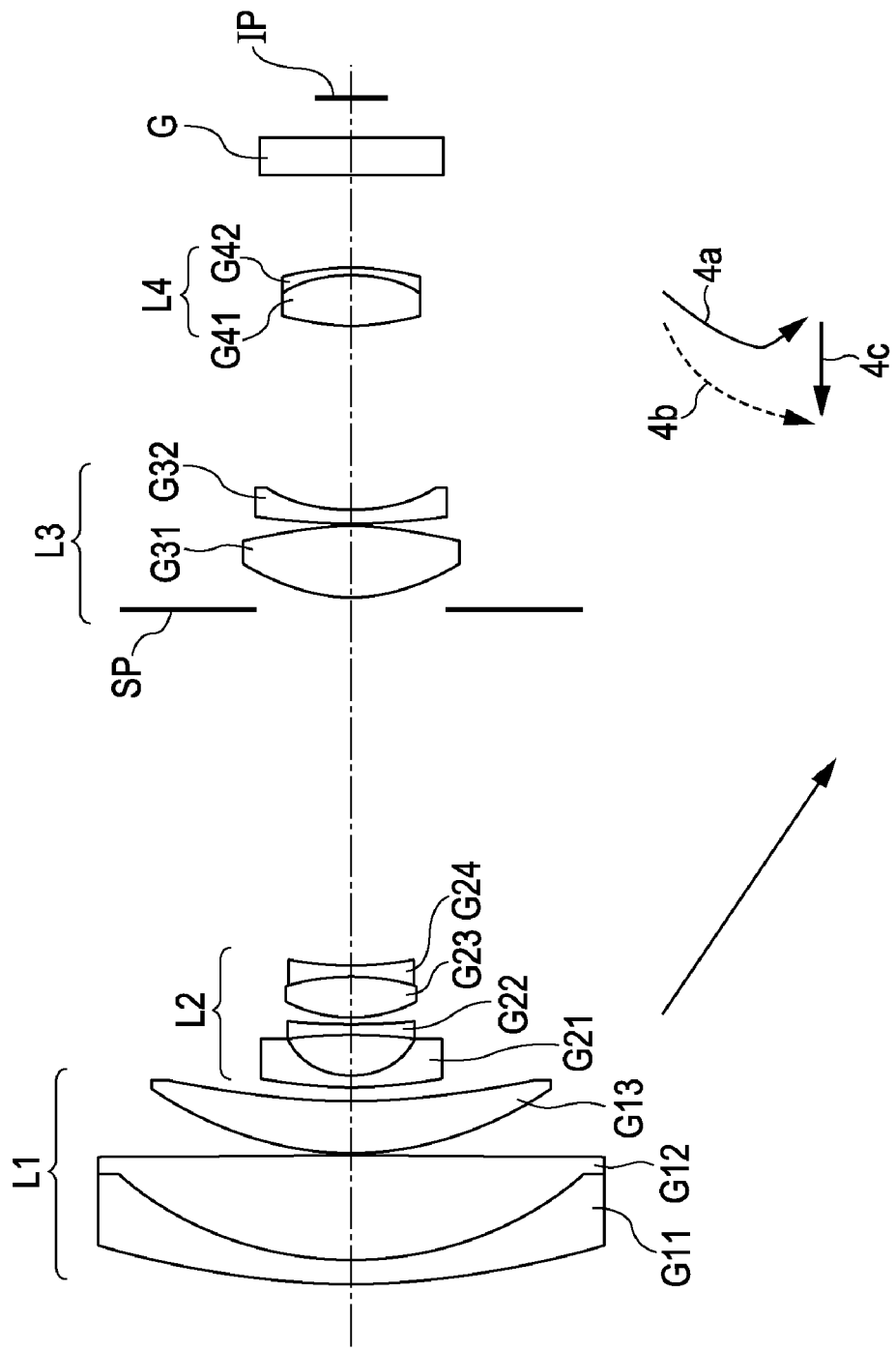
FIG. 5 is a cross-sectional view of a zoom lens at a wide-angle end according to a second embodiment of the present invention.
Figure 6:
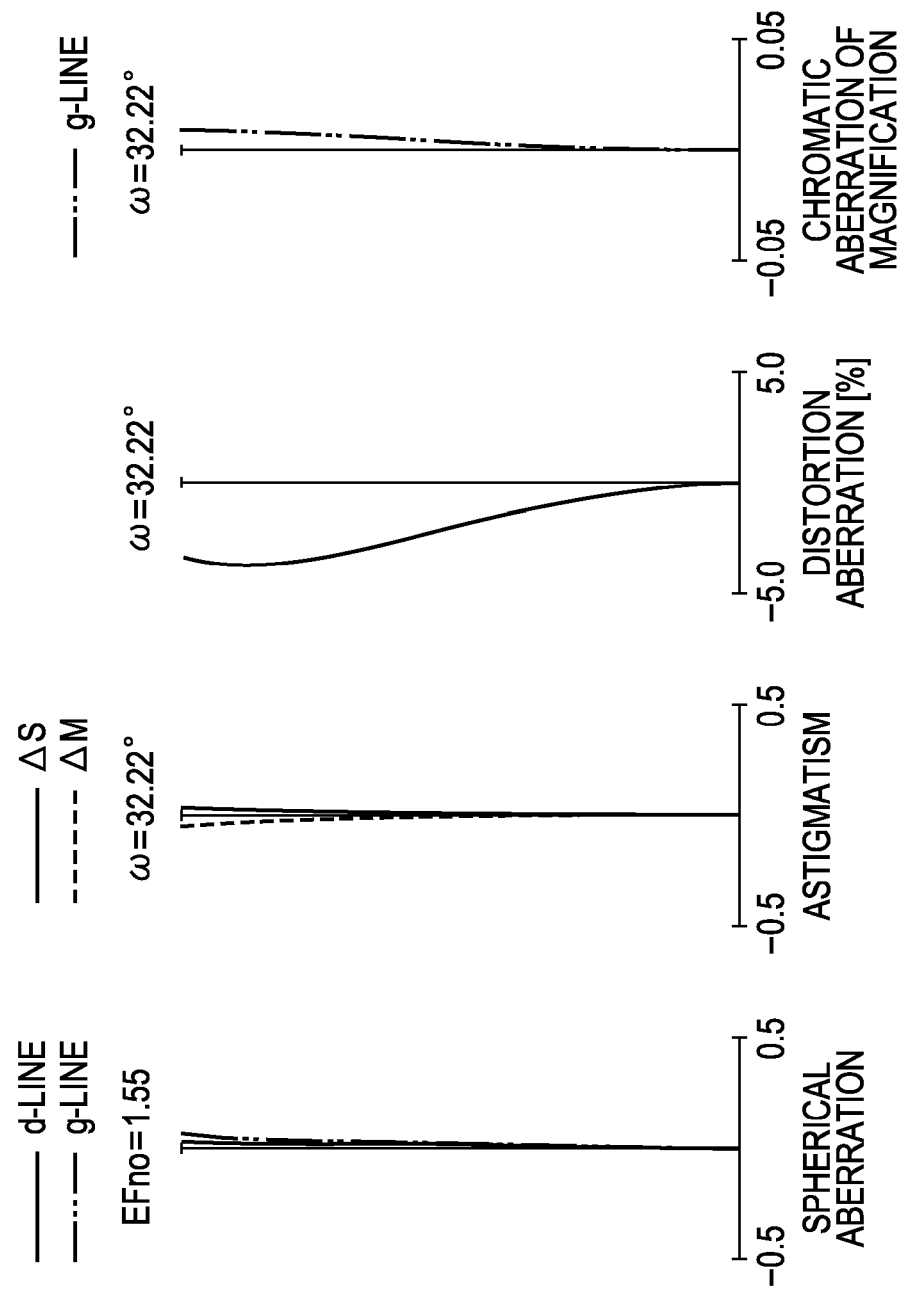
FIG. 6 is an aberration diagram of the zoom lens at a wide-angle end according to the second embodiment.
Figure 7:
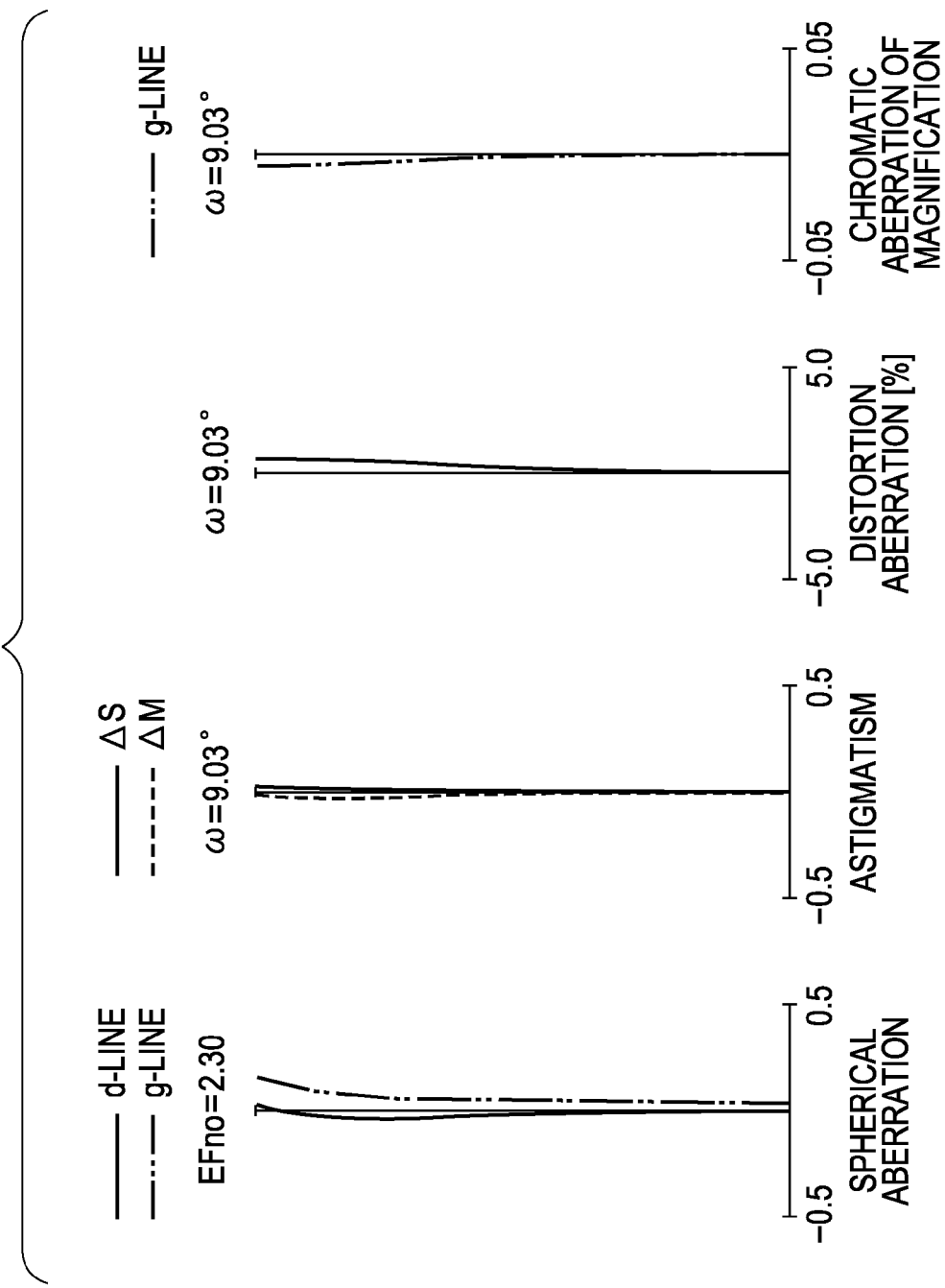
FIG. 7 is an aberration diagram of the zoom lens at a middle zoom position according to the second embodiment.
Figure 8:
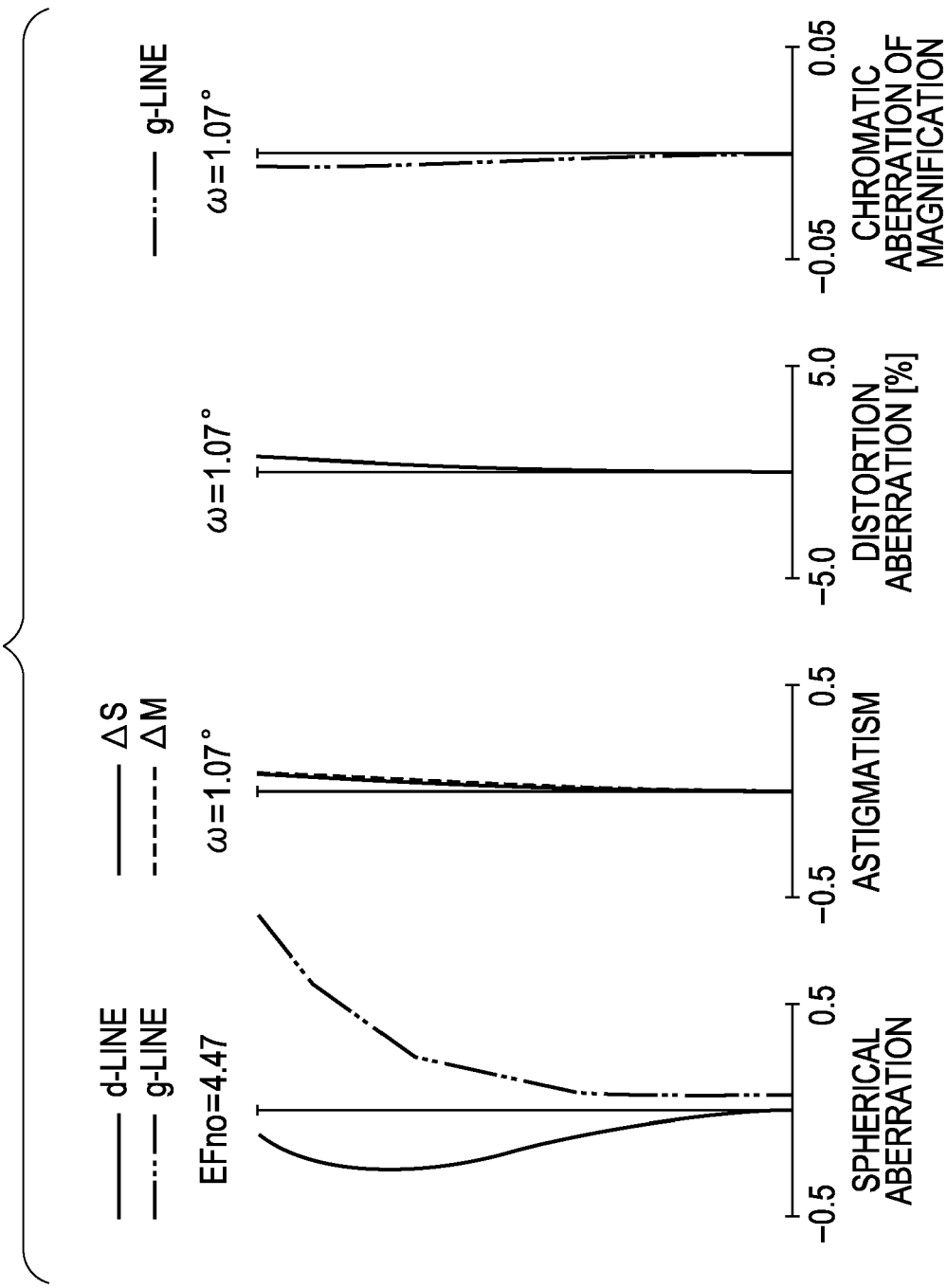
FIG. 8 is an aberration diagram of the zoom lens at a telephoto end according to the second embodiment.

FIG. 5 is a cross-sectional view of a main portion of a zoom lens according to a second embodiment at a wide-angle end. FIGS. 6, 7, and 8 are aberration diagrams of the zoom lens according to the second embodiment at a wide-angle end (a minimum focal length end), a middle focal length position (a middle zoom position), and a telephoto end (a maximum focal length end), respectively.

Figure 9:
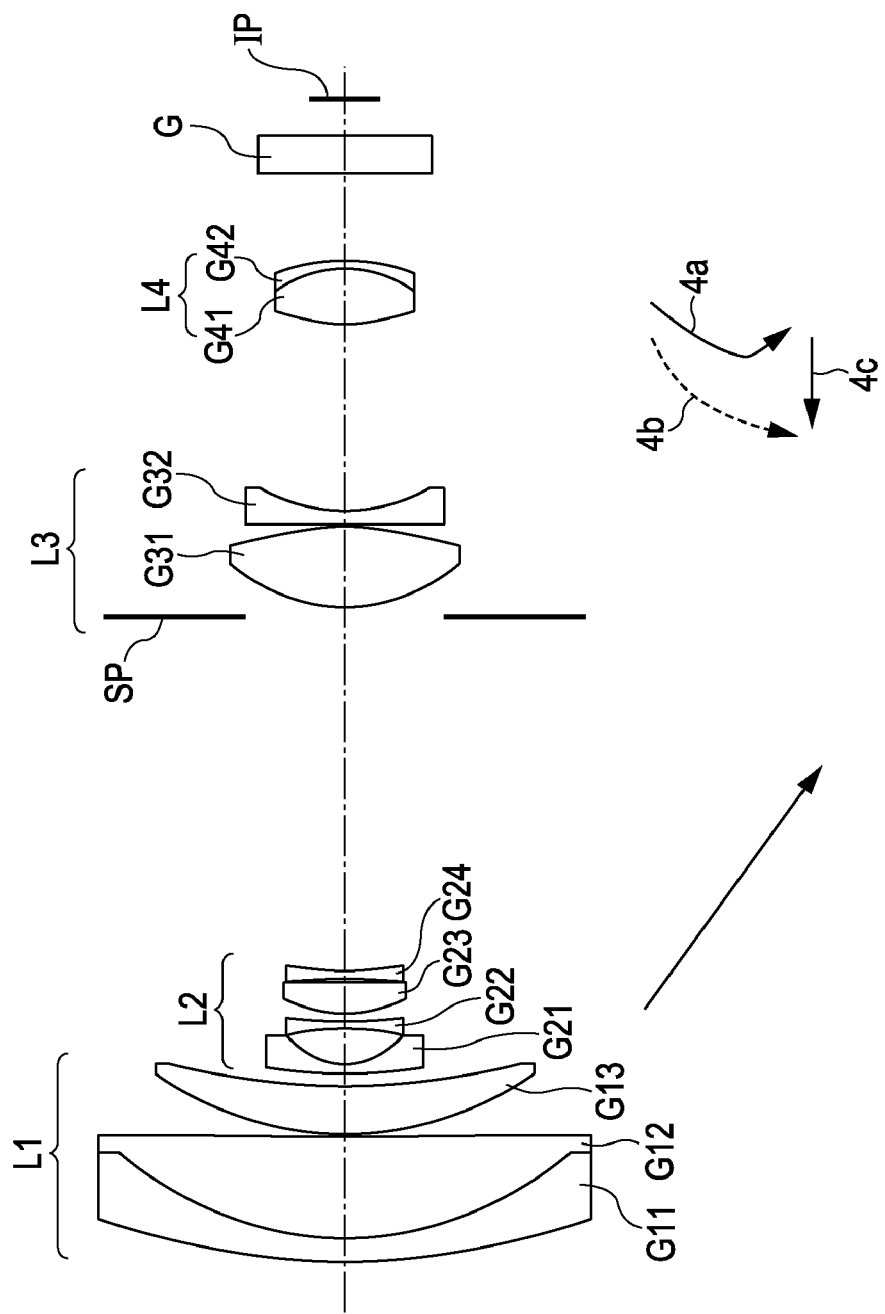
FIG. 9 is a cross-sectional view of a zoom lens at a wide-angle end according to a third embodiment of the present invention.
Figure 10:
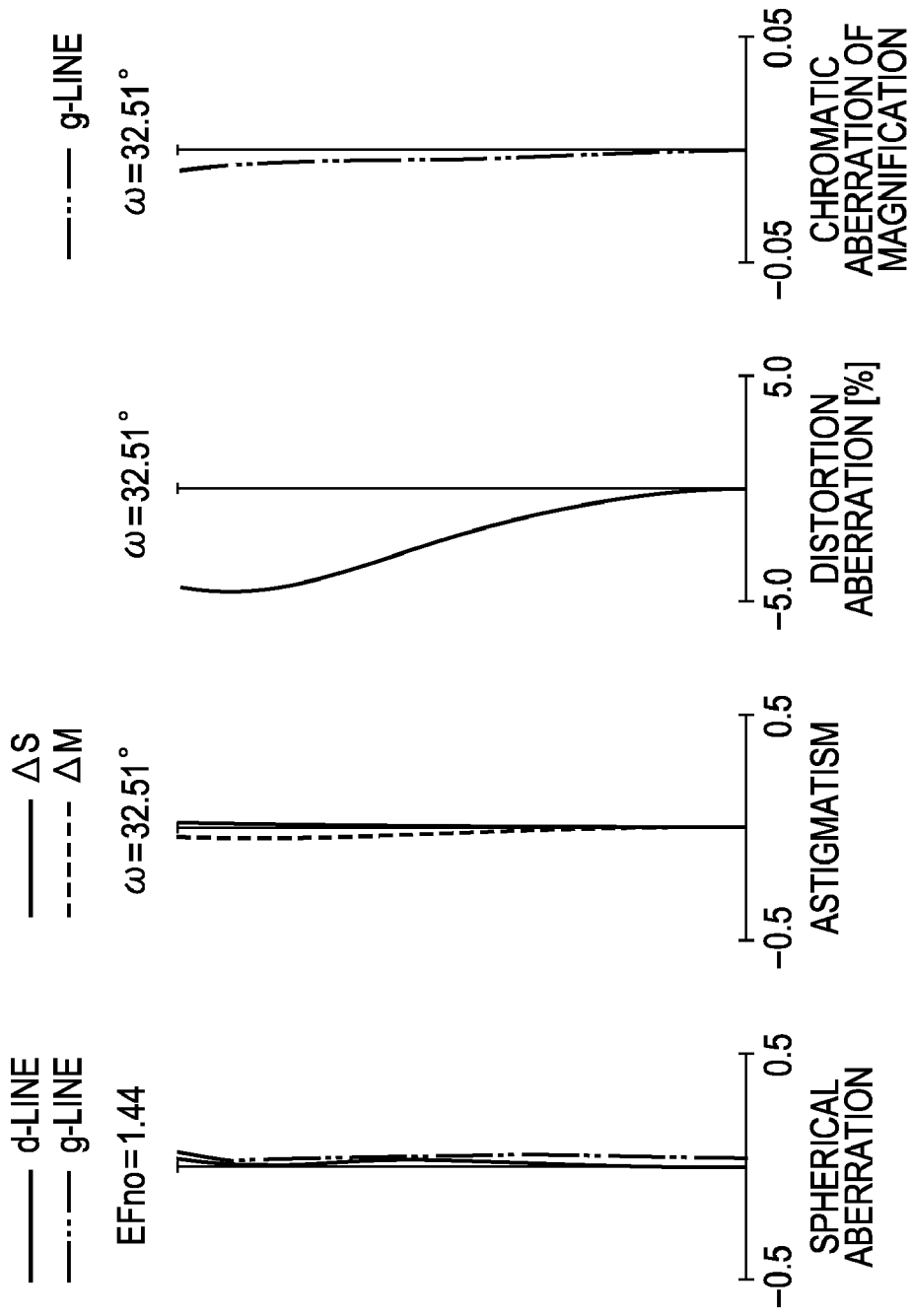
FIG. 10 is an aberration diagram of the zoom lens at a wide-angle end according to the third embodiment.
Figure 11:
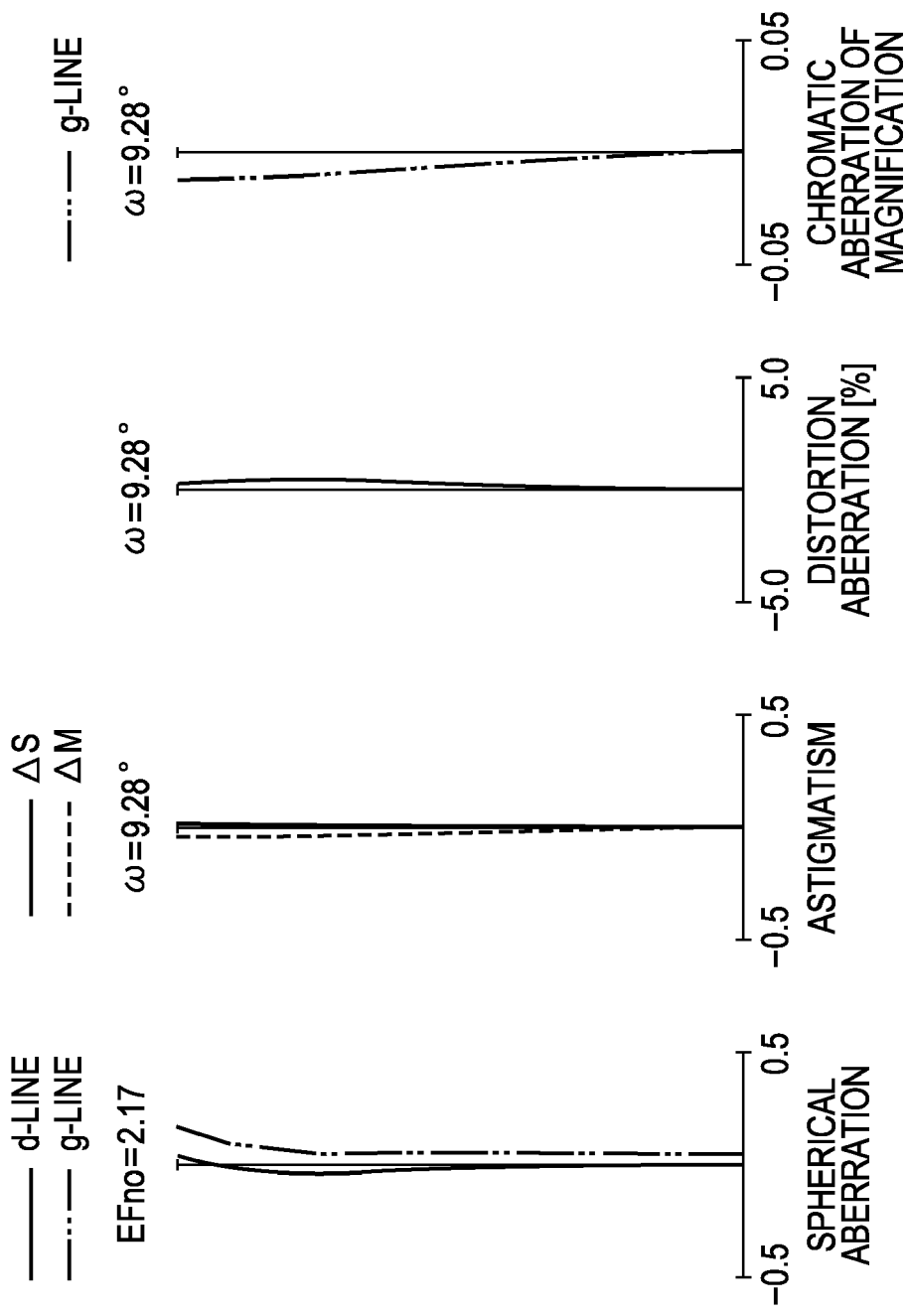
FIG. 11 is an aberration diagram of the zoom lens at a middle zoom position according to the third embodiment.
Figure 12:
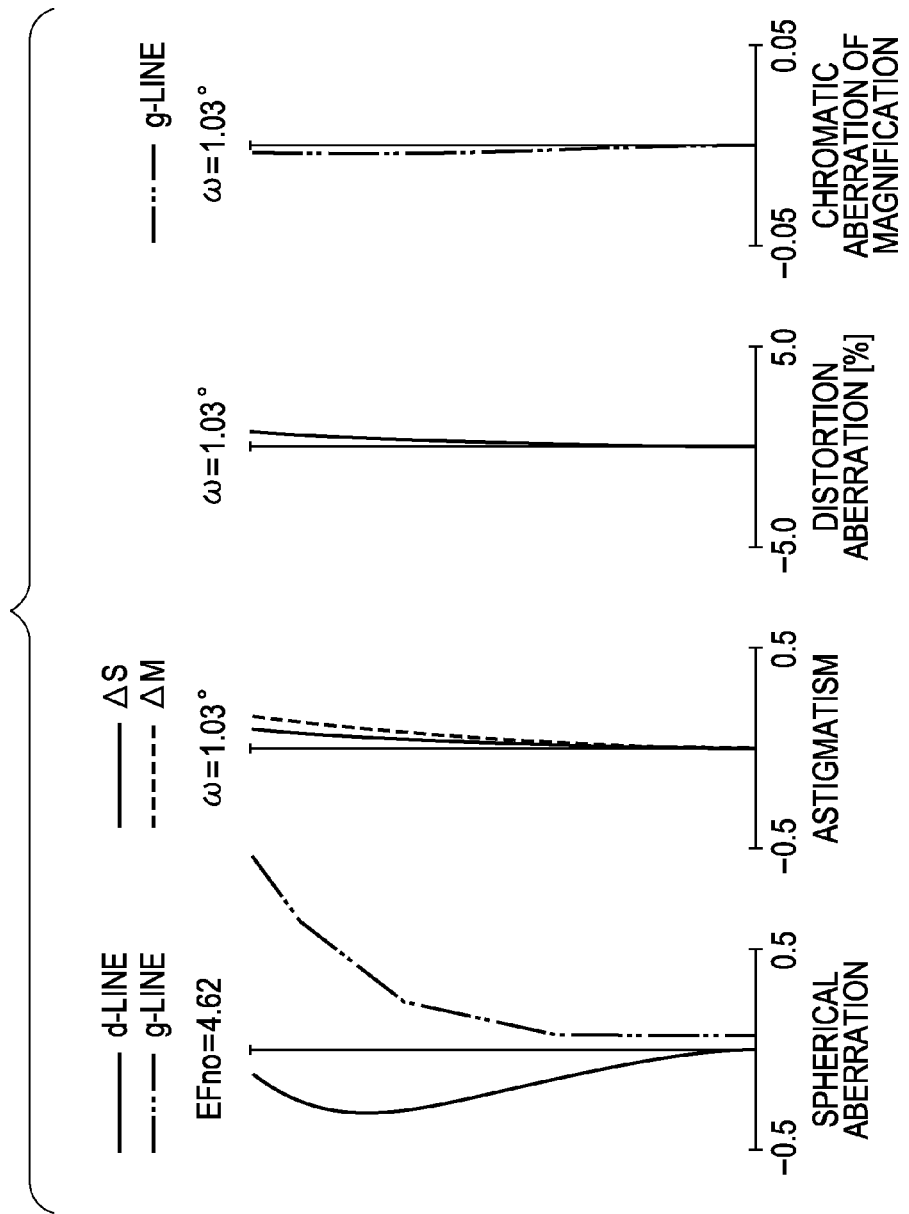
FIG. 12 is an aberration diagram of the zoom lens at a telephoto end according to the third embodiment.

FIG. 9 is a cross-sectional view of a main portion of a zoom lens according to a third embodiment at a wide-angle end. FIGS. 10, 11, and 12 are aberration diagrams of the zoom lens according to the third embodiment at a wide-angle end (a minimum focal length end), a middle focal length position (a middle zoom position), and a telephoto end (a maximum focal length end), respectively.

Figure 13:
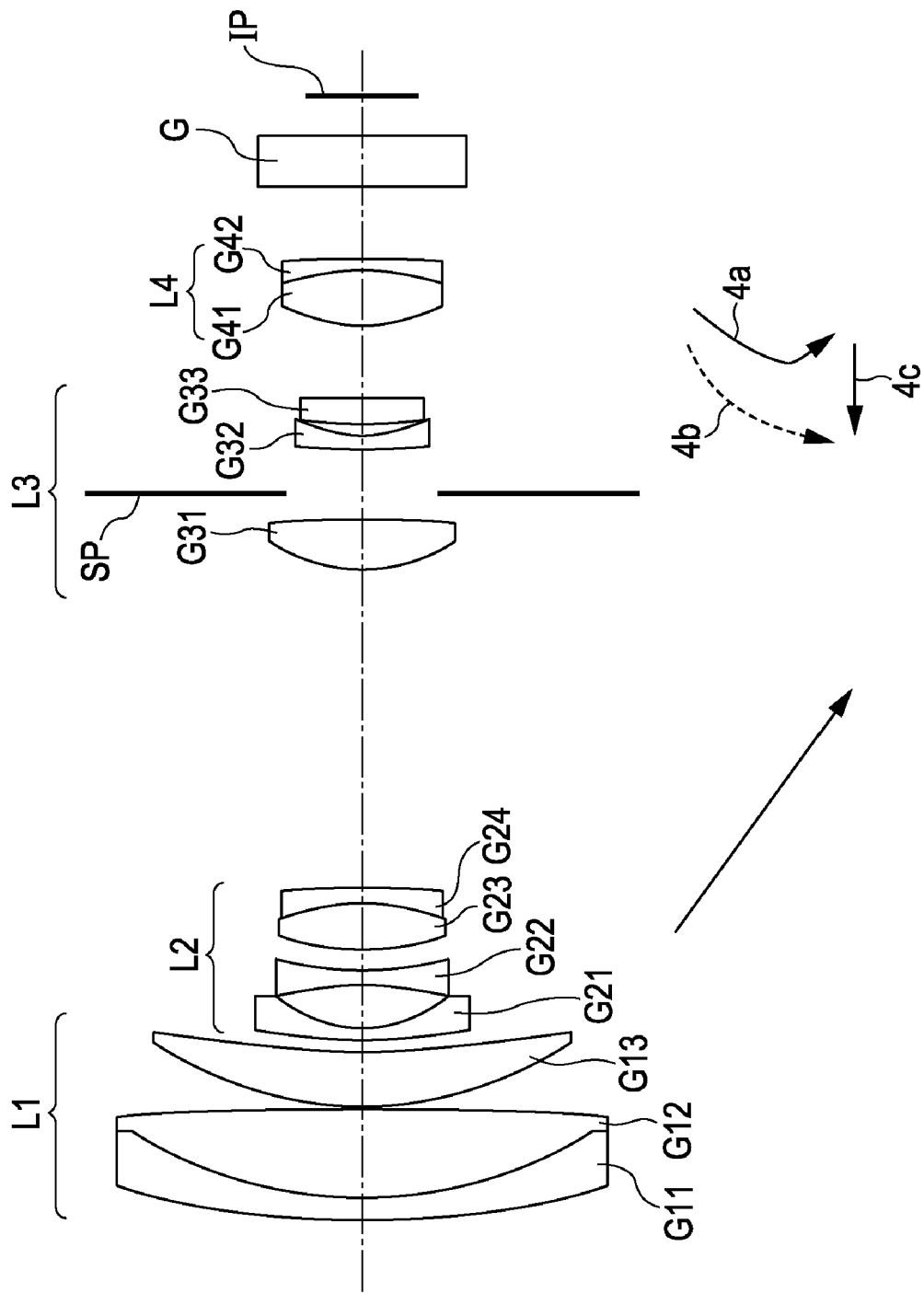
FIG. 13 is a cross-sectional view of a zoom lens at a wide-angle end according to a fourth embodiment of the present invention.
Figure 14:
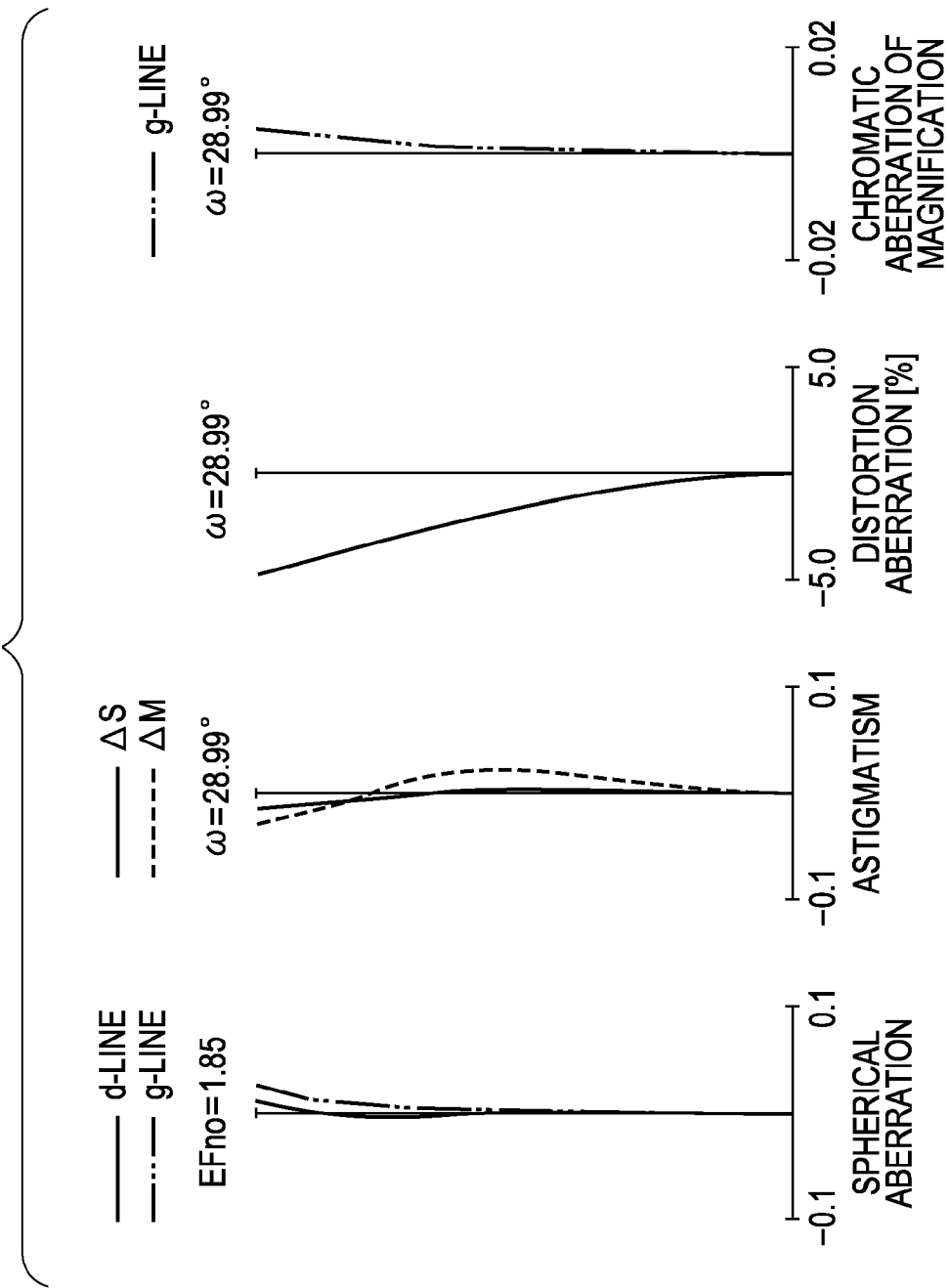
FIG. 14 is an aberration diagram of the zoom lens at a wide-angle end according to the fourth embodiment.
Figure 15:
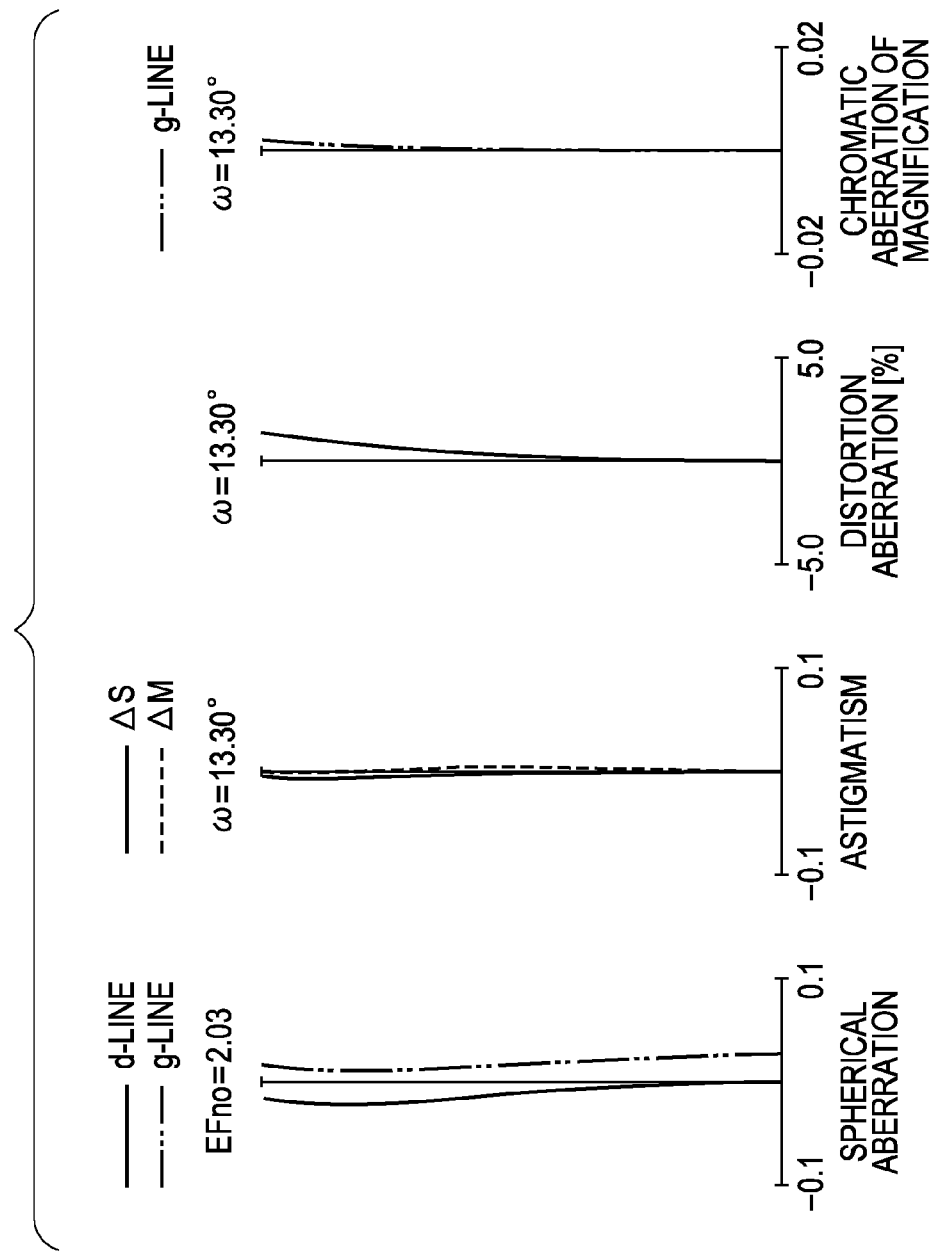
FIG. 15 is an aberration diagram of the zoom lens at a middle zoom position according to the fourth embodiment.
Figure 16:
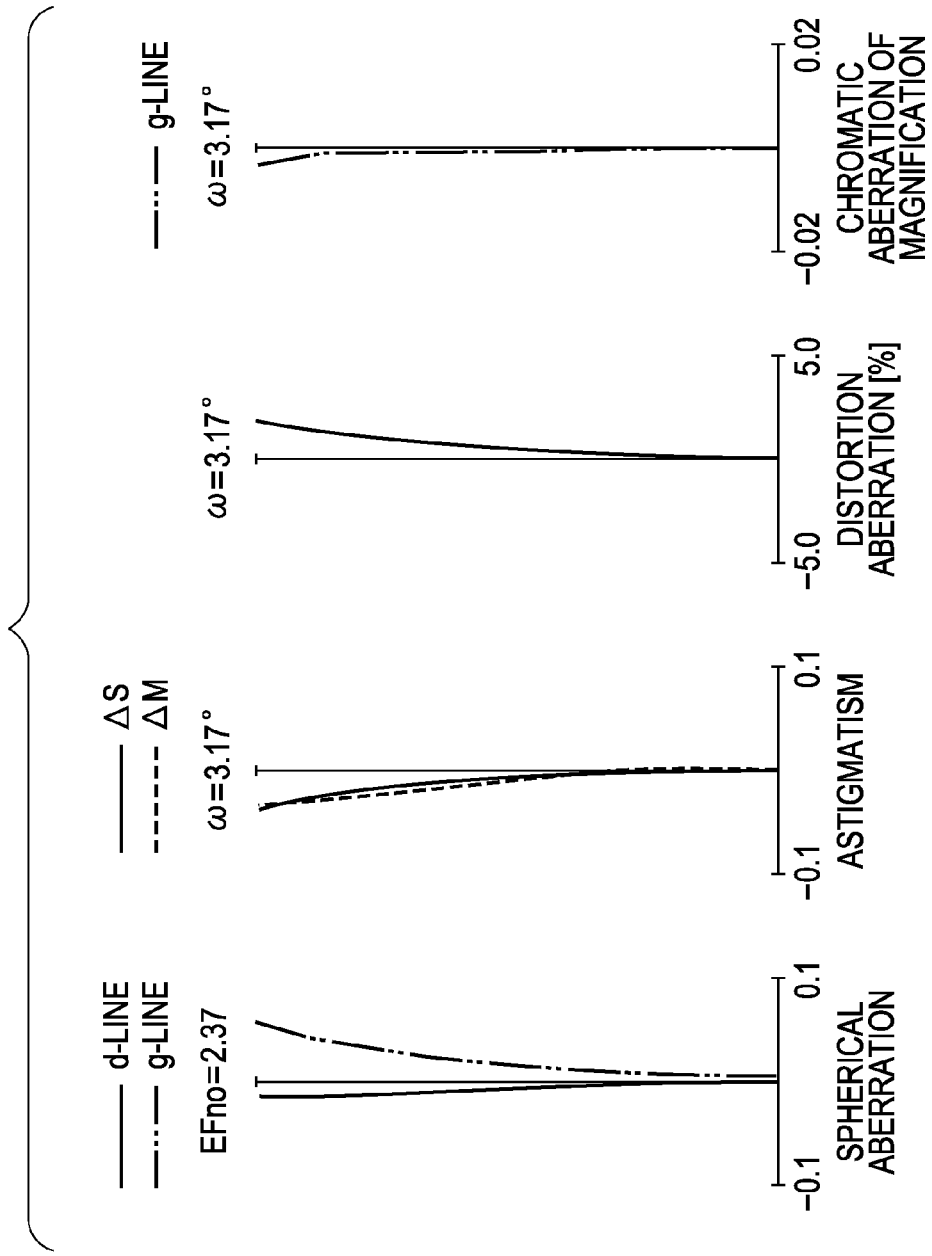
FIG. 16 is an aberration diagram of the zoom lens at a telephoto end according to the fourth embodiment.

FIG. 13 is a cross-sectional view of a main portion of a zoom lens according to a fourth embodiment at a wide-angle end. FIGS. 14, 15, and 16 are aberration diagrams of the zoom lens according to the fourth embodiment at a wide-angle end (a minimum focal length end), a middle focal length position (a middle zoom position), and a telephoto end (a maximum focal length end), respectively.

Figure 17:
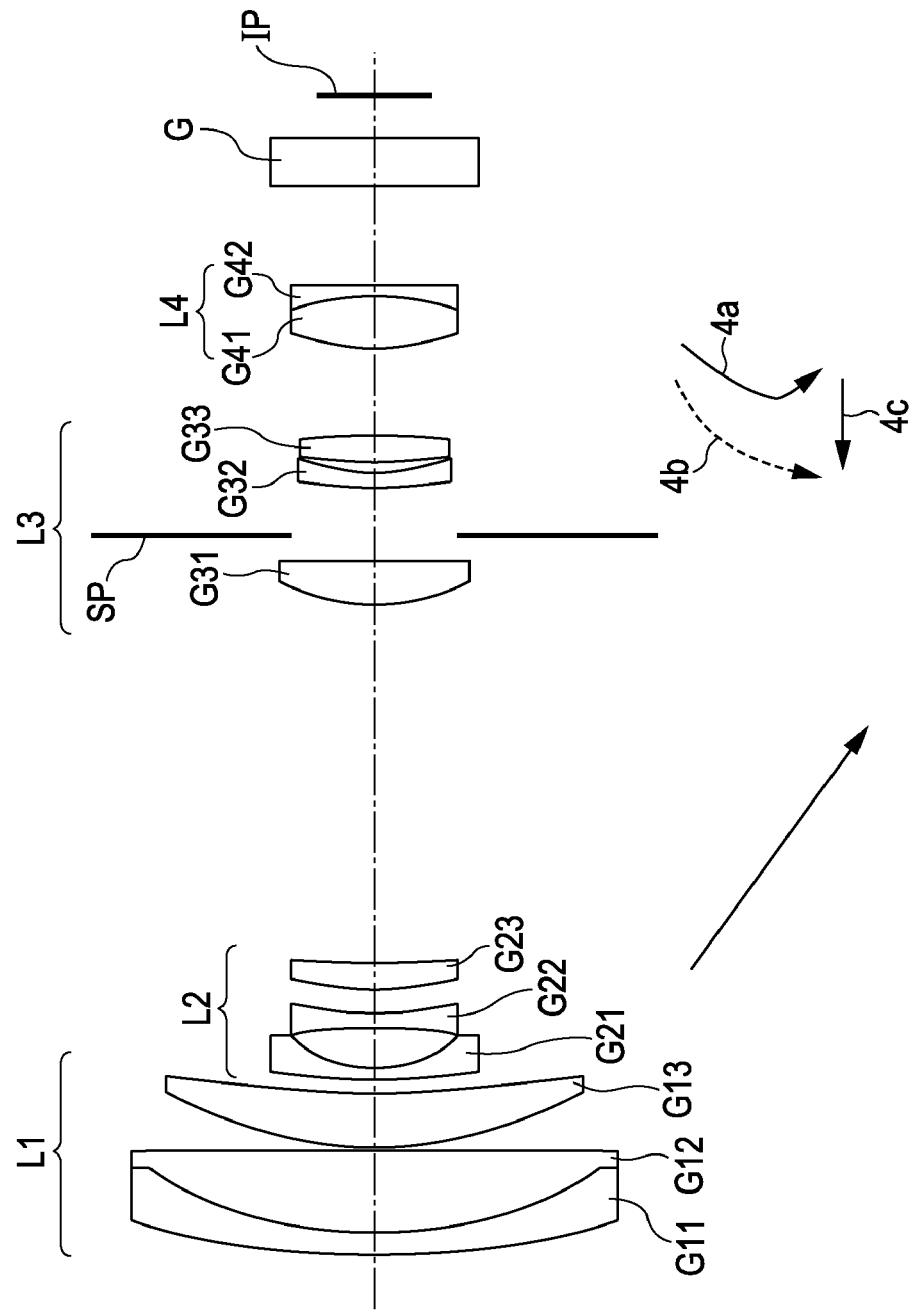
FIG. 17 is a cross-sectional view of a zoom lens at a wide-angle end according to a fifth embodiment of the present invention.
Figure 18:
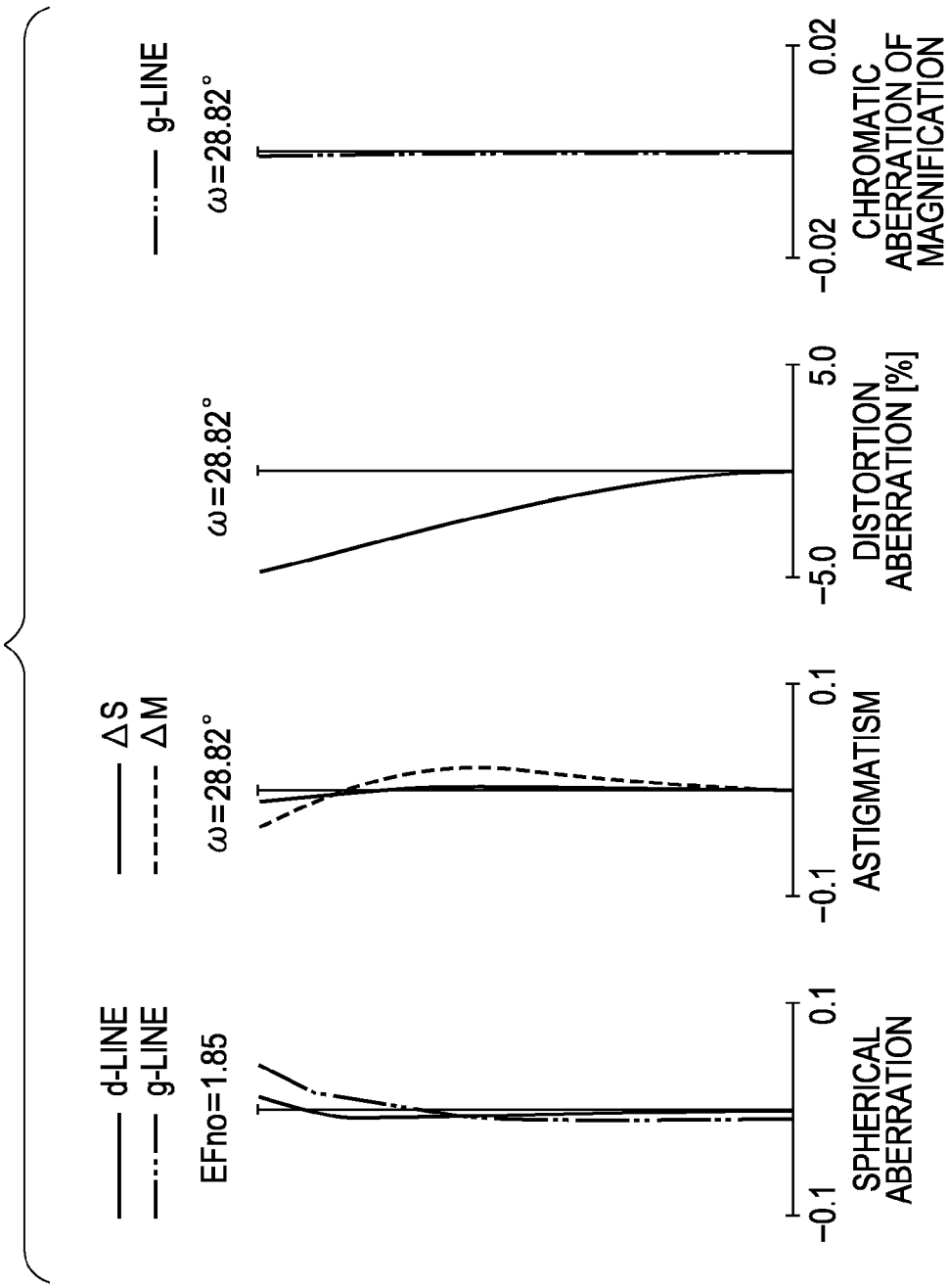
FIG. 18 is an aberration diagram of the zoom lens at a wide-angle end according to the fifth embodiment.
Figure 19:
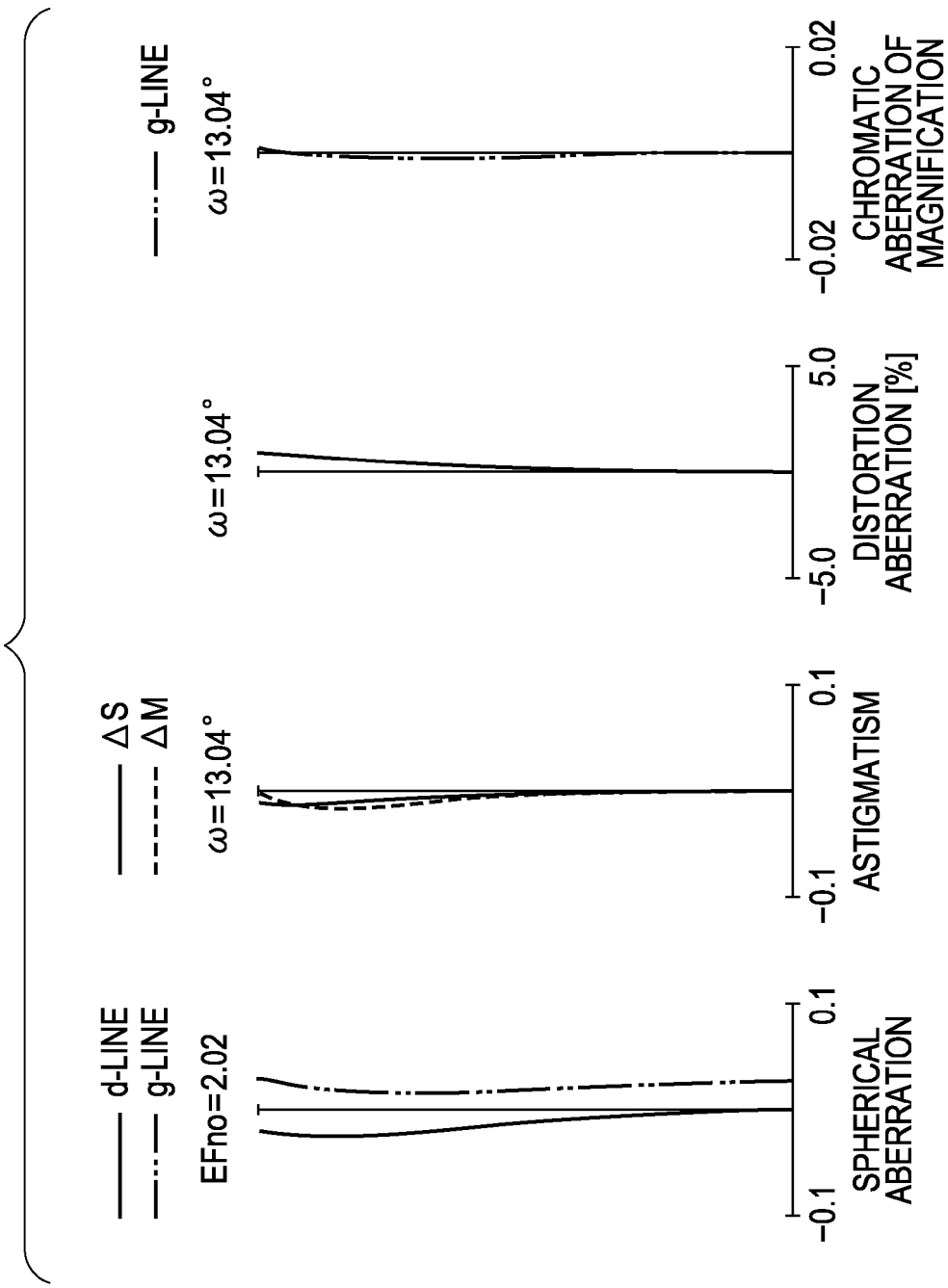
FIG. 19 is an aberration diagram of the zoom lens at a middle zoom position according to the fifth embodiment.
Figure 20:
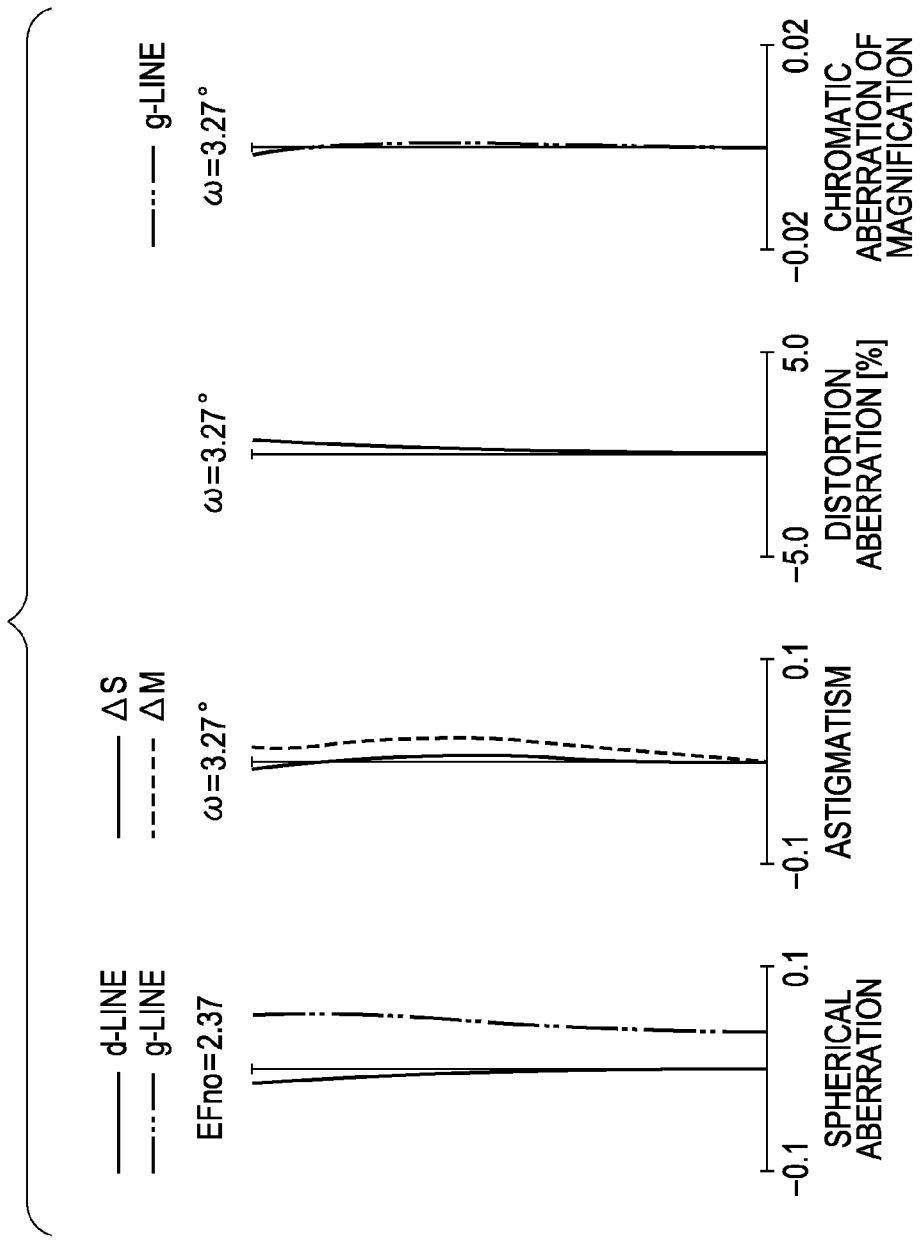
FIG. 20 is an aberration diagram of the zoom lens at a telephoto end according to the fifth embodiment.

FIG. 17 is a cross-sectional view of a main portion of a zoom lens according to a fifth embodiment at a wide-angle end. FIGS. 18, 19, and 20 are aberration diagrams of the zoom lens according to the fifth embodiment at a wide-angle end (a minimum focal length end), a middle focal length position (a middle zoom position), and a telephoto end (a maximum focal length end), respectively.

Figure 21:
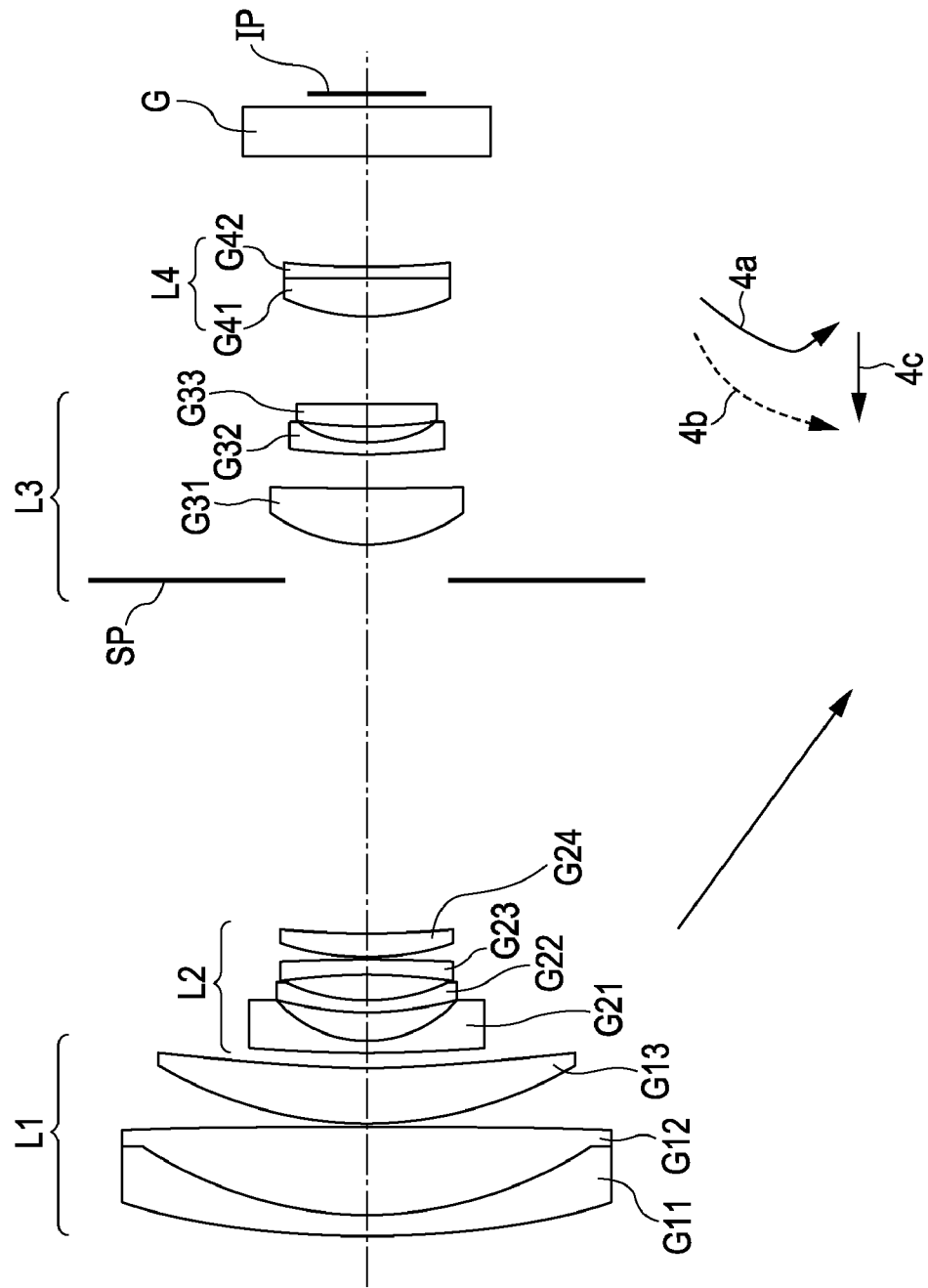
FIG. 21 is a cross-sectional view of a zoom lens at a wide-angle end according to a sixth embodiment of the present invention.
Figure 22:
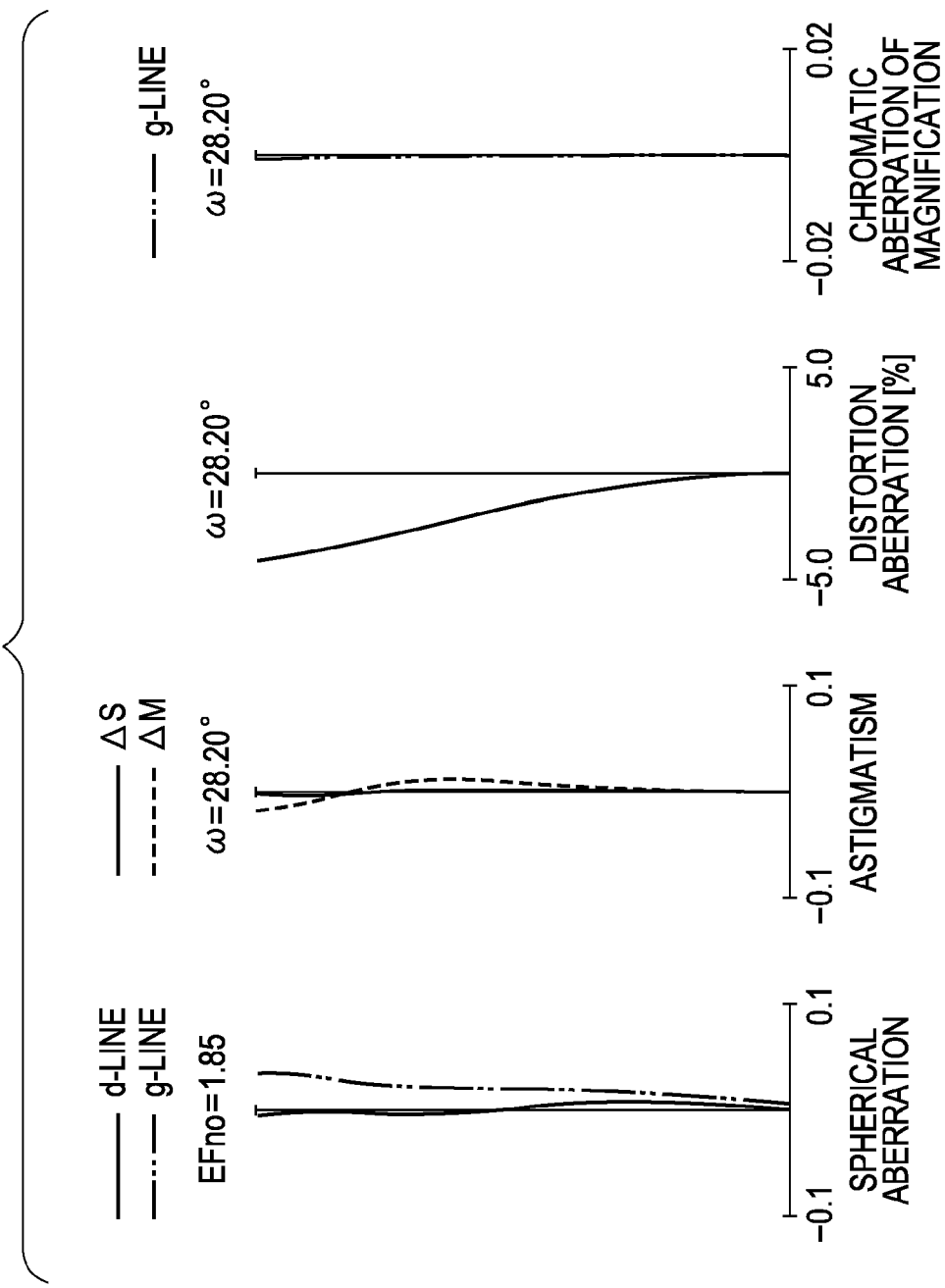
FIG. 22 is an aberration diagram of the zoom lens at a wide-angle end according to the sixth embodiment.
Figure 23:
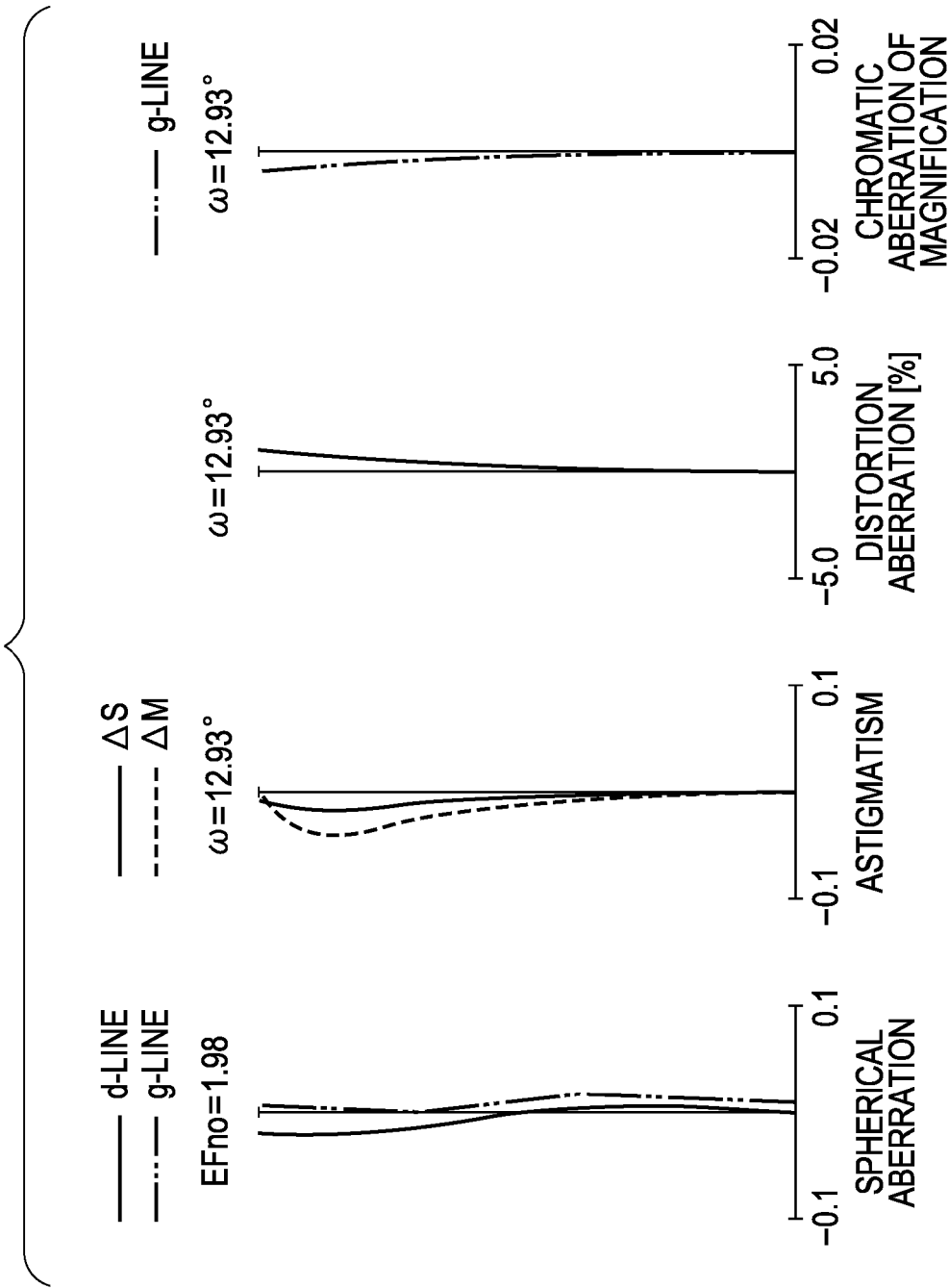
FIG. 23 is an aberration diagram of the zoom lens at a middle zoom position according to the sixth embodiment.
Figure 24:
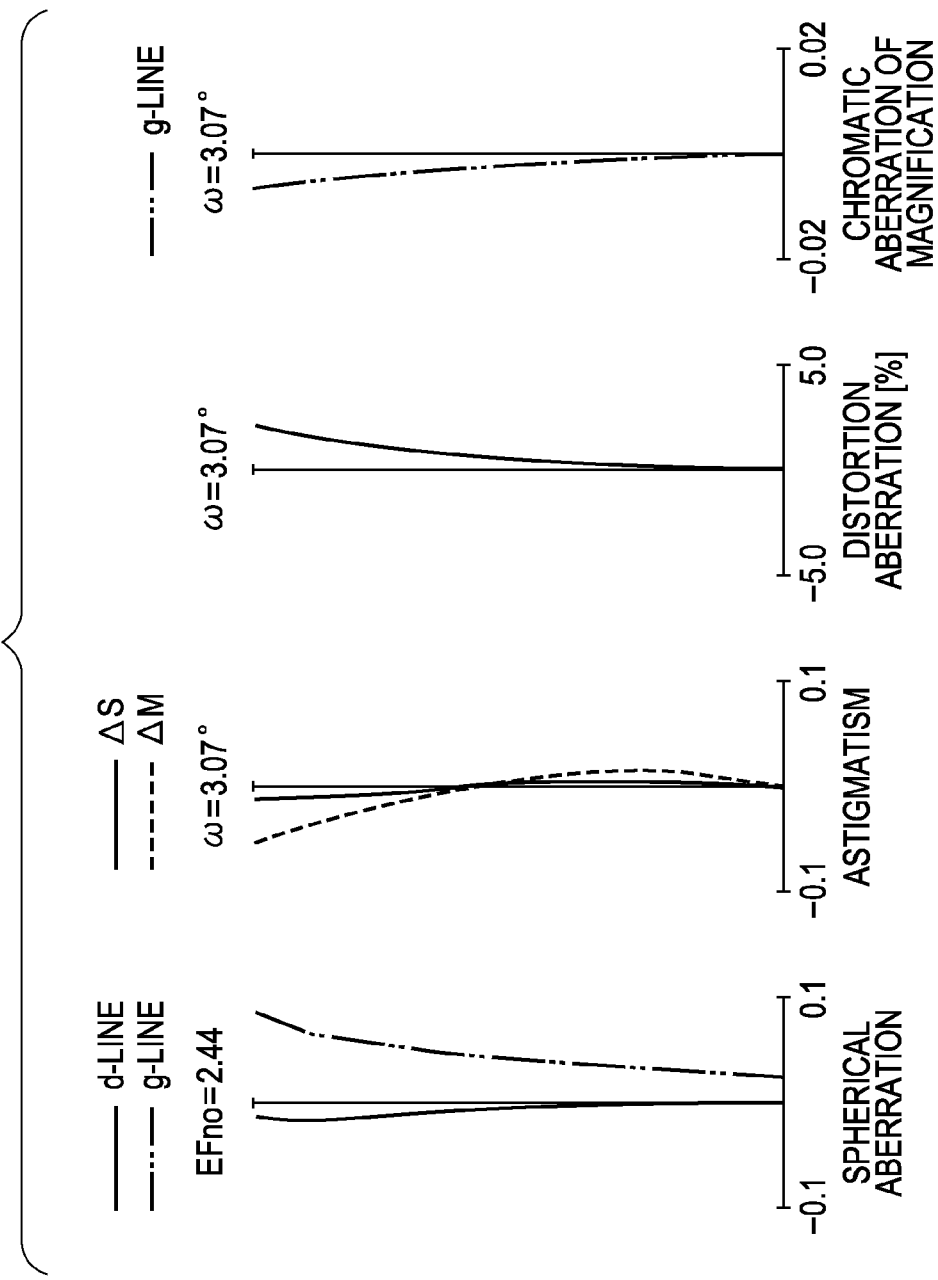
FIG. 24 is an aberration diagram of the zoom lens at a telephoto end according to the sixth embodiment.

FIG. 21 is a cross-sectional view of a main portion of a zoom lens according to a sixth embodiment at a wide-angle end. FIGS. 22, 23, and 24 are aberration diagrams of the zoom lens according to the sixth embodiment at a wide-angle end (a minimum focal length end), a middle focal length position (a middle zoom position), and a telephoto end (a maximum focal length end), respectively.

Figure 25:
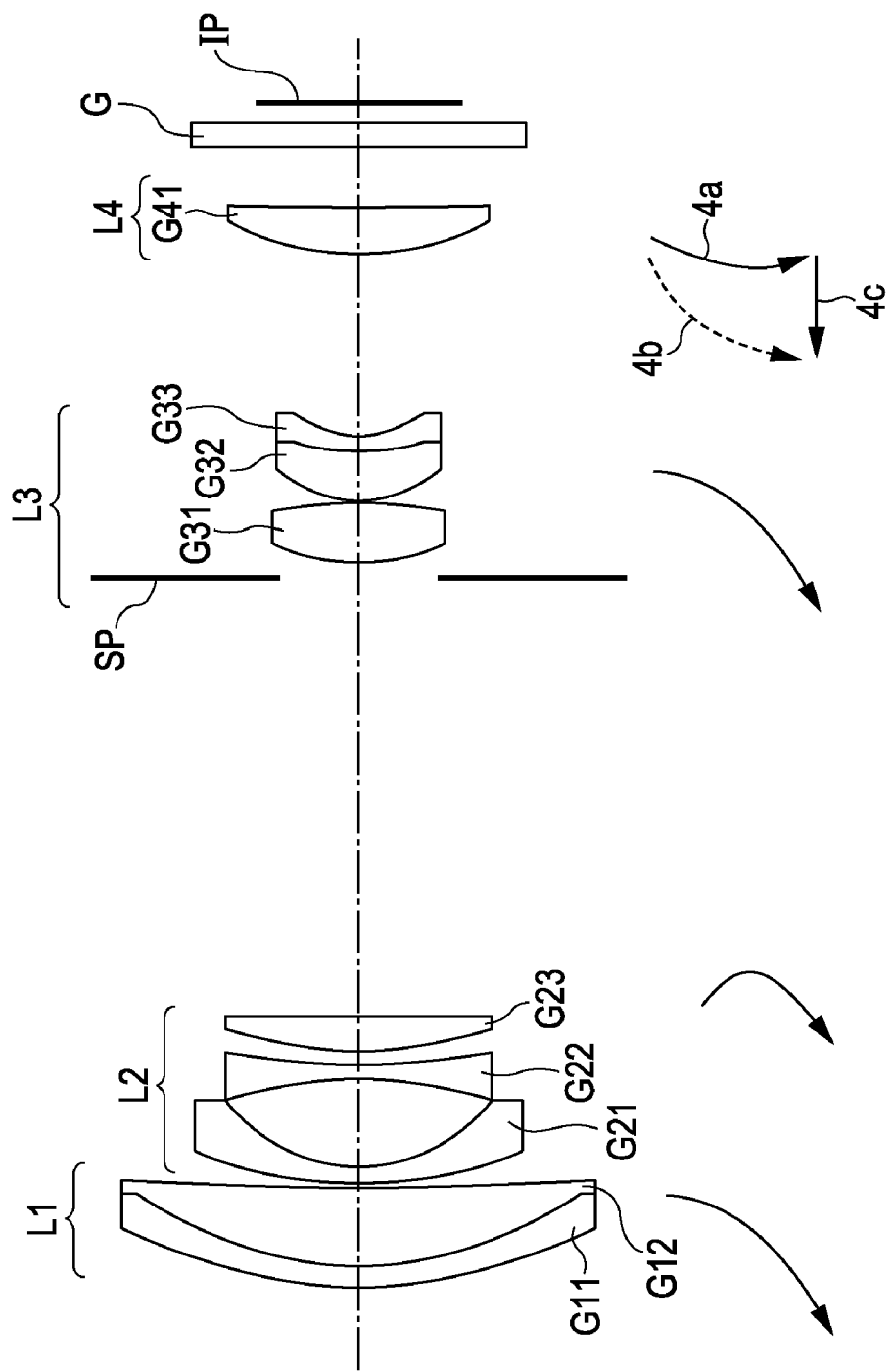
FIG. 25 is a cross-sectional view of a zoom lens at a wide-angle end according to a seventh embodiment of the present invention.
Figure 26:
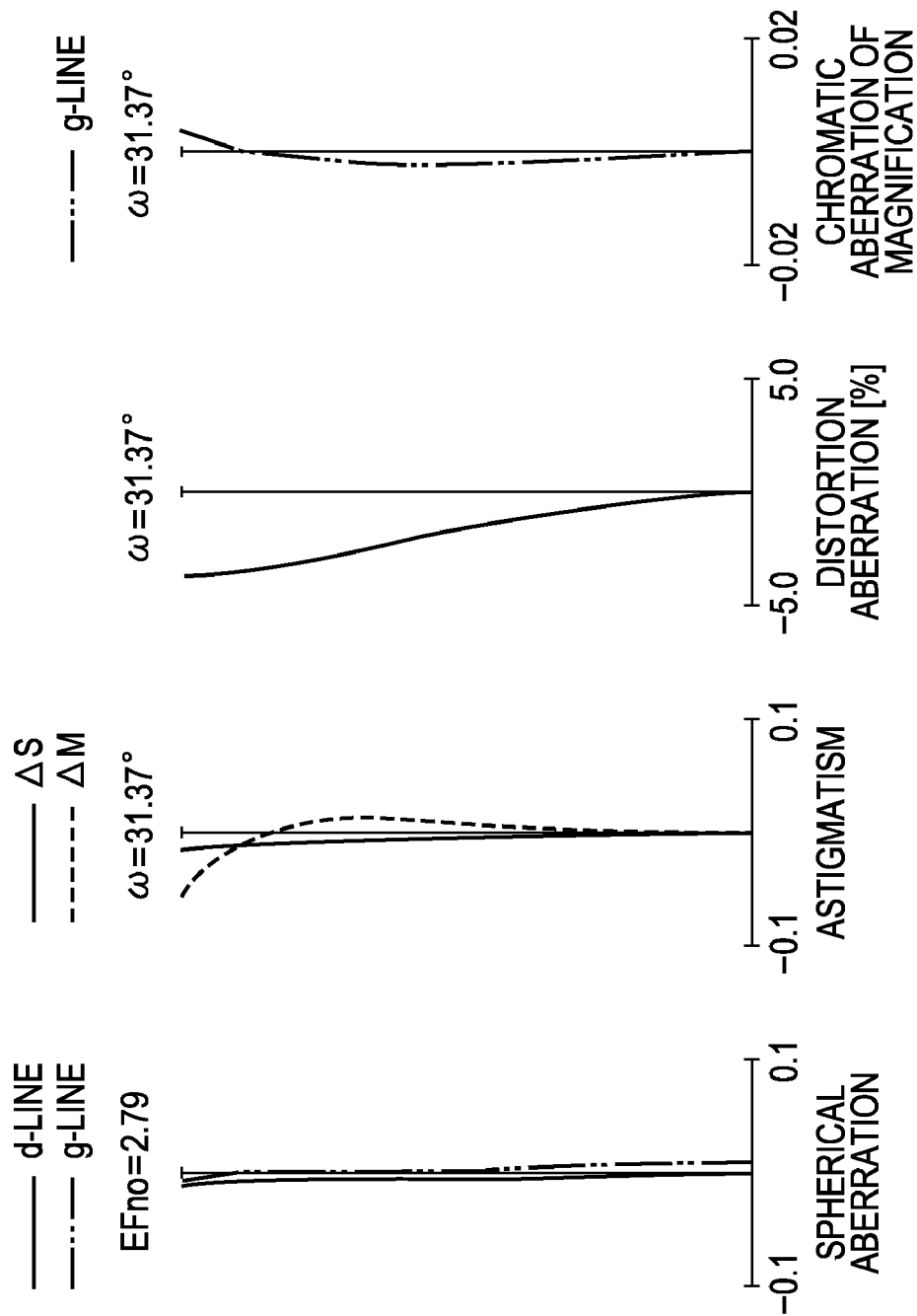
FIG. 26 is an aberration diagram of the zoom lens at a wide-angle end according to the seventh embodiment.
Figure 27:
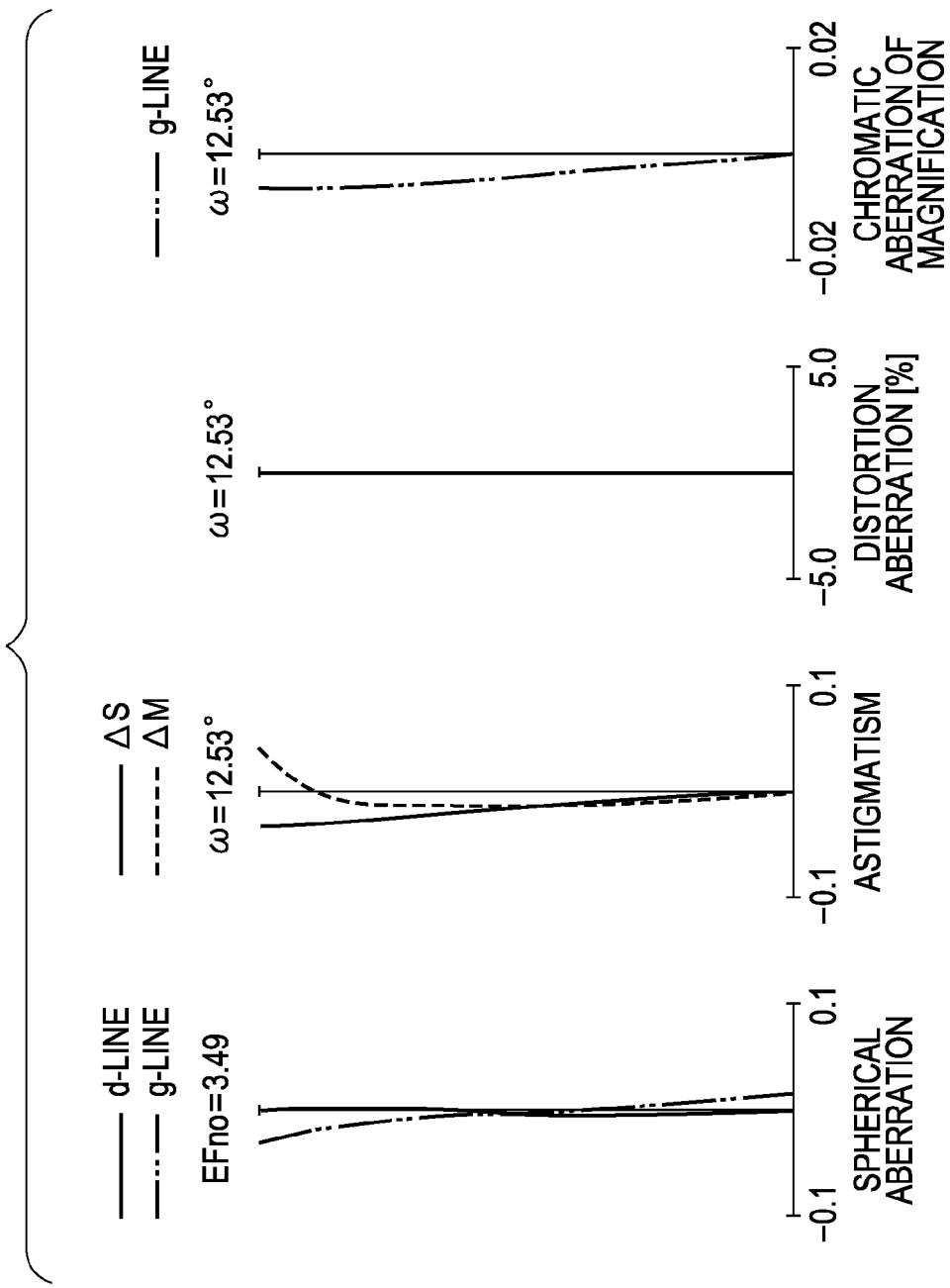
FIG. 27 is an aberration diagram of the zoom lens at a middle zoom position according to the seventh embodiment.
Figure 28:
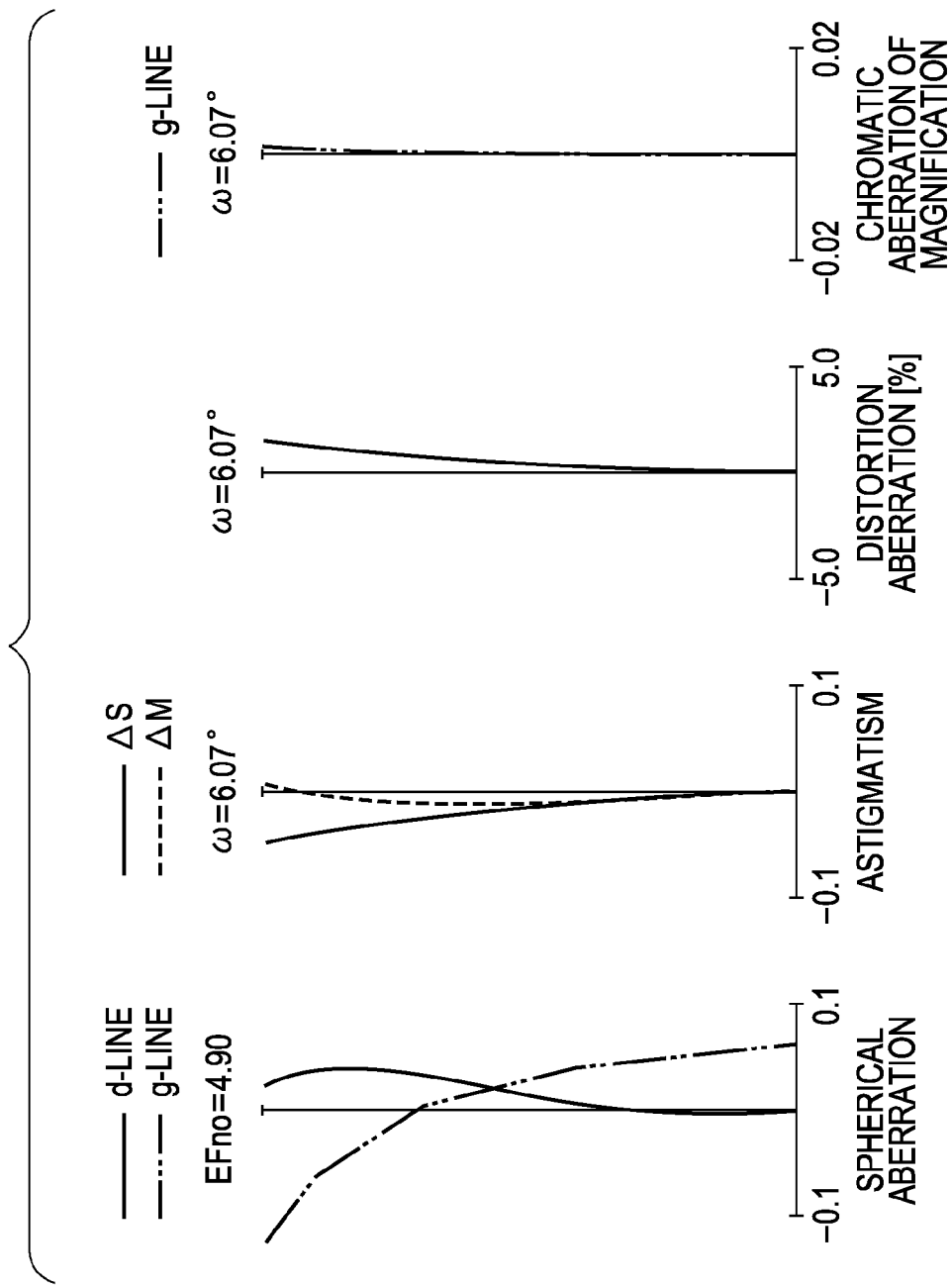
FIG. 28 is an aberration diagram of the zoom lens at a telephoto end according to the seventh embodiment.

FIG. 25 is a cross-sectional view of a main portion of a zoom lens according to a seventh embodiment at a wide-angle end. FIGS. 26, 27, and 28 are aberration diagrams of the zoom lens according to the seventh embodiment at a wide-angle end (a minimum focal length end), a middle focal length position (a middle zoom position), and a telephoto end (a maximum focal length end), respectively.

Figure 29:
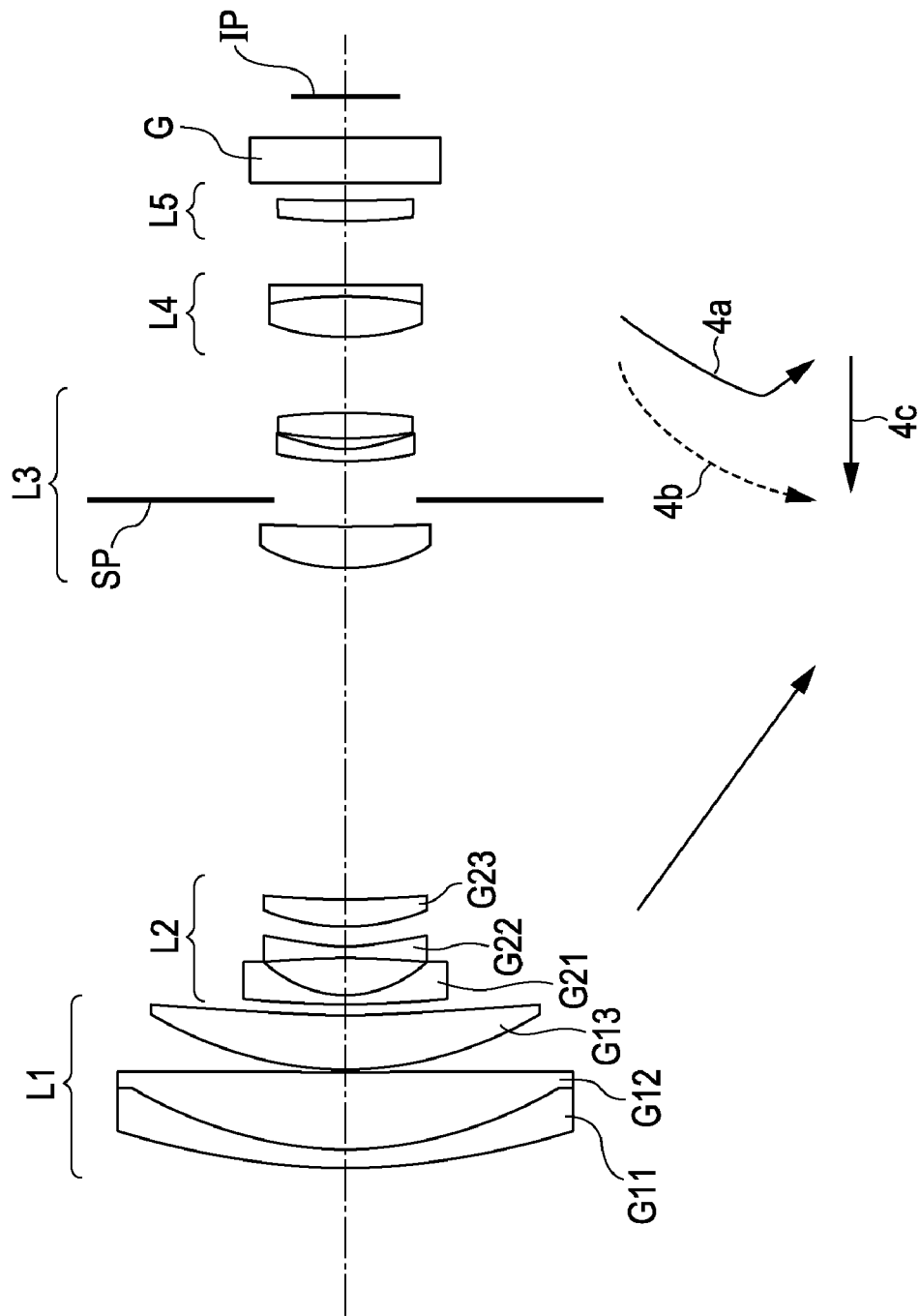
FIG. 29 is a cross-sectional view of a zoom lens at a wide-angle end according to an eighth embodiment of the present invention.
Figure 30:
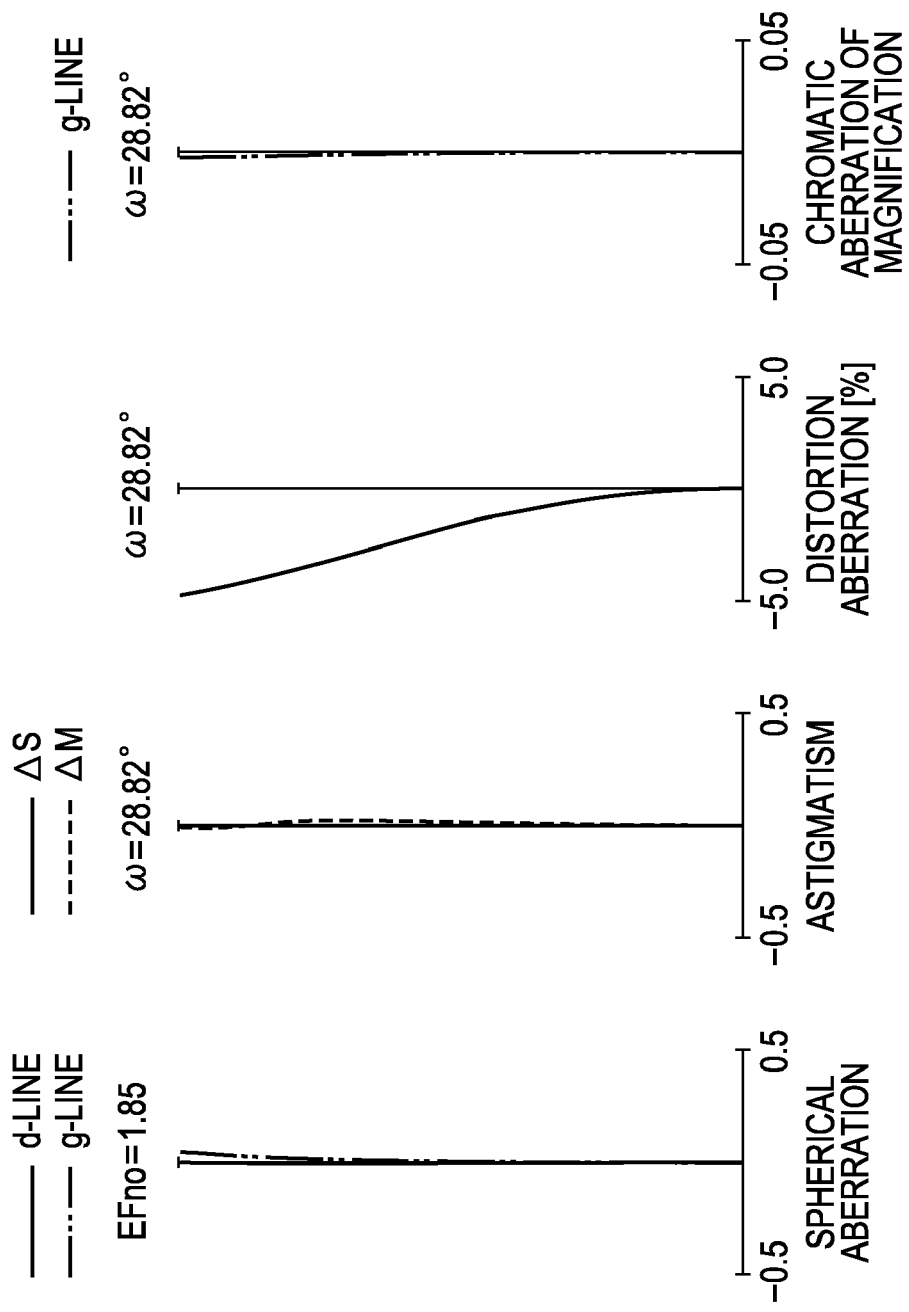
FIG. 30 is an aberration diagram of the zoom lens at a wide-angle end according to the eighth embodiment.
Figure 31:
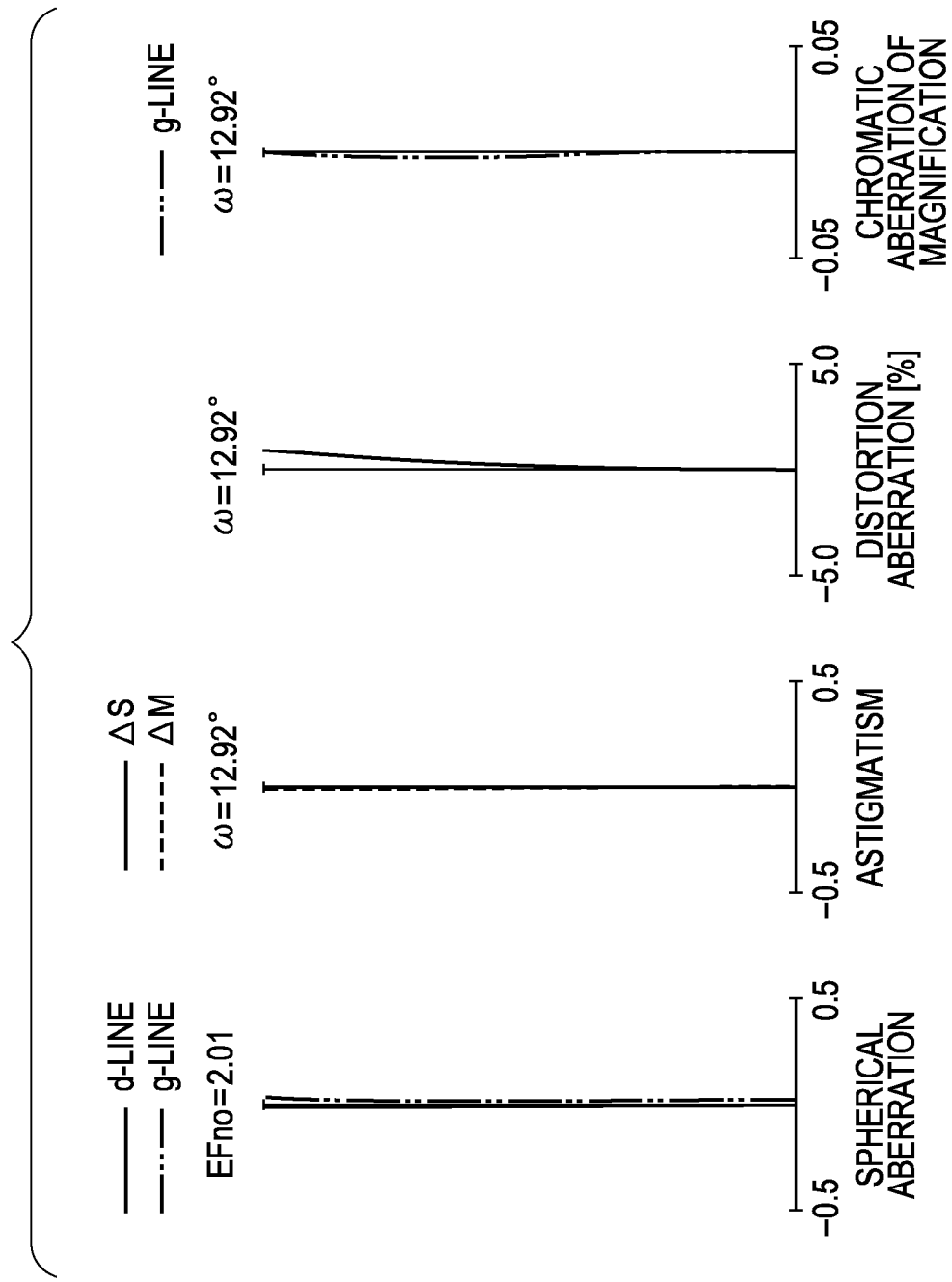
FIG. 31 is an aberration diagram of the zoom lens at a middle zoom position according to the eighth embodiment.
Figure 32:
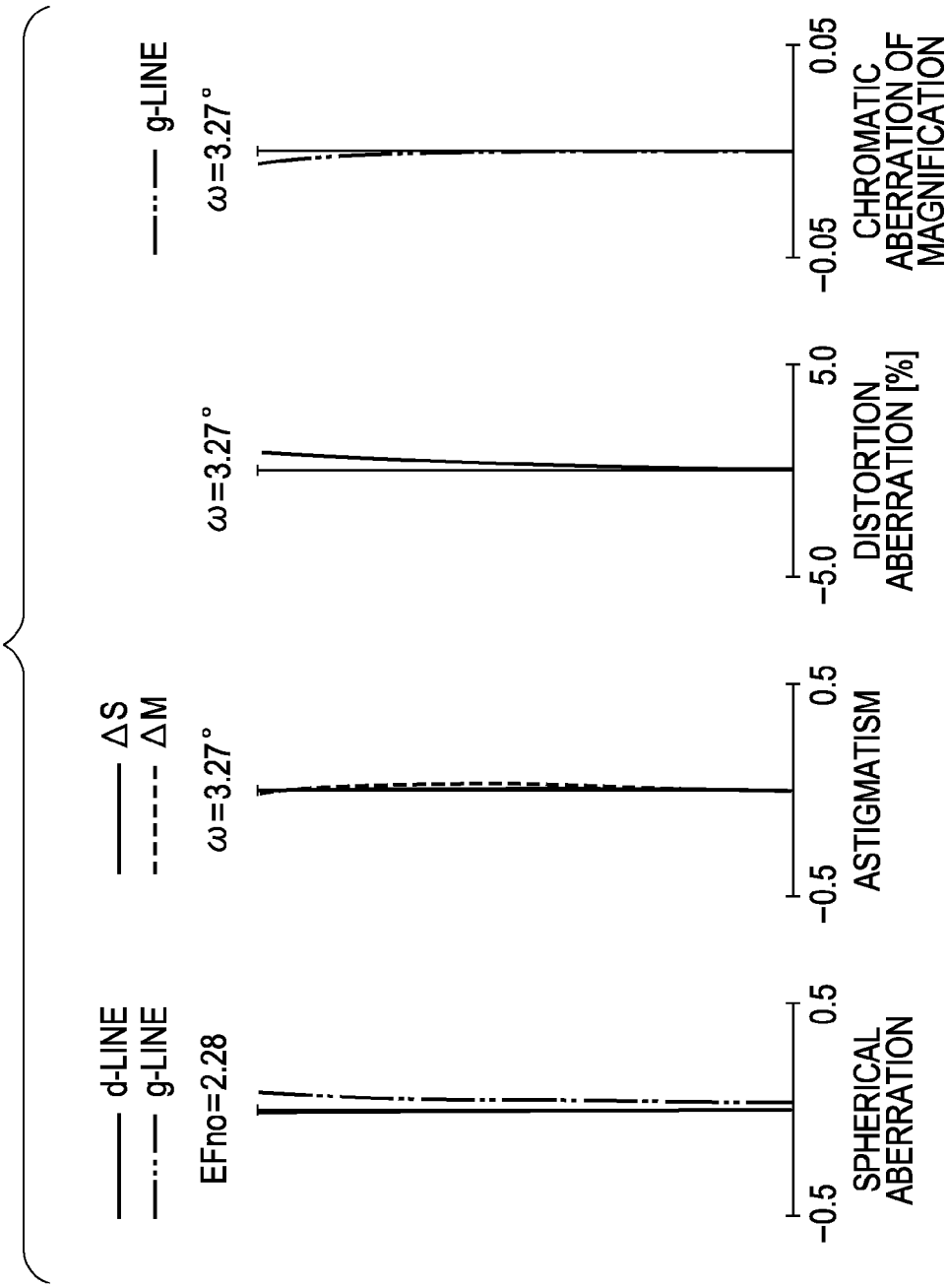
FIG. 32 is an aberration diagram of the zoom lens at a telephoto end according to the eighth embodiment.

FIG. 29 is a cross-sectional view of a main portion of a zoom lens according to an eighth embodiment at a wide-angle end. FIGS. 30, 31, and 32 are aberration diagrams of the zoom lens according to the eighth embodiment at a wide-angle end (a minimum focal length end), a middle focal length position (a middle zoom position), and a telephoto end (a maximum focal length end), respectively.

Figure 33:
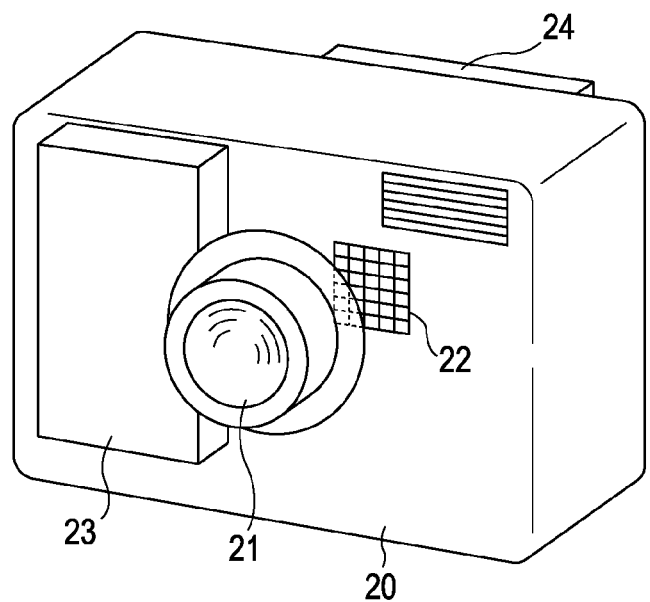
FIG. 33 is a schematic illustration of a main portion of a digital camera according to an embodiment of the present invention.
Figure 34:
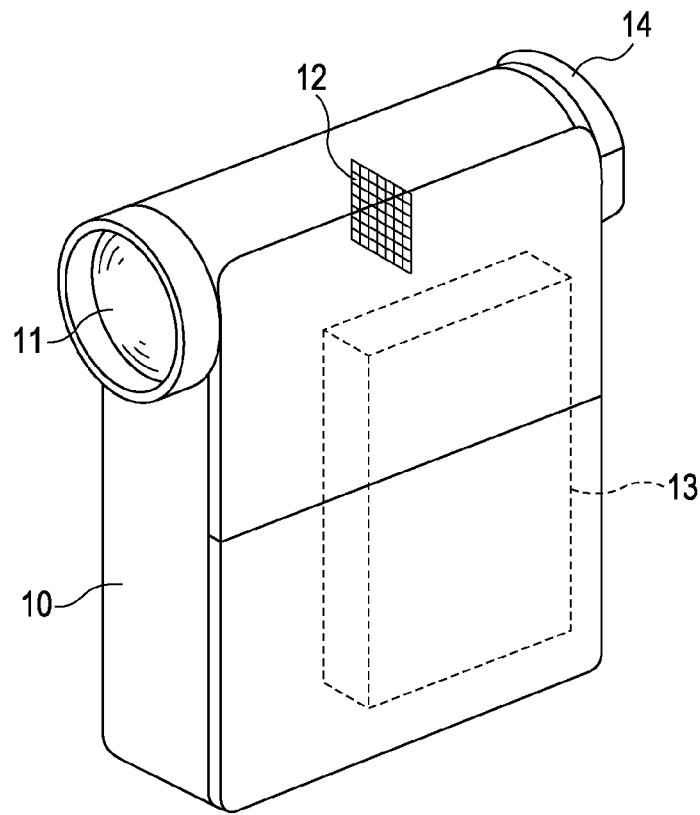
FIG. 34 is a schematic illustration of a video camera according to an embodiment of the present invention.

FIGS. 33 and 34 are schematic illustrations of a camera (an image pickup apparatus) including the zoom lens according to one of the embodiments of the present invention.

The zoom lens according to each of the embodiments of the present invention is an image taking lens system used for video cameras and digital still cameras. In the cross-sectional views of the zoom lens, an object is located on the left (the front side), and an image is located on the right (the rear side).

In the case where the zoom lenses of the embodiments are used for projection lenses of, for example, projectors, a screen is located on the left side, and an image to be projected is located on the right side.

In the cross-sectional views of the zoom lens, "L1" denotes a first lens unit having a positive refractive power (i.e., optical power=an inverse number of a focal length), "L2" denotes a second lens unit having a negative refractive power, "L3" denotes a third lens unit having a positive refractive power, "L4" denotes a fourth lens unit having a positive refractive power, "L5" denotes a fifth lens unit having a weak refractive power. Note that the fifth lens unit L5 is used only in the eighth embodiment (refer to FIG. 29).

In addition, the rear lens component includes two lens units: a third lens unit L3 and a fourth lens unit L4. Alternatively, the rear lens component includes three lens units: the third lens unit L3, the fourth lens unit L4, and a fifth lens unit L5. However, the rear lens component may further include another lens unit.

"SP" represents an aperture stop. The aperture stop SP is disposed on the object side of the third lens unit L3 in zoom lenses of the embodiments 1 to 3 and the embodiments 6 and 7 illustrated in FIGS. 1, 5, 9, 21, and 25.

In contrast, the aperture stop SP is disposed in the third lens unit L3 of the zoom lenses of the embodiments 4, 5, and 8 illustrated in FIGS. 13, 17, and 29.

"G" represents an optical block including an optical filter, a face plate, a quartz low-pass filter, and an infrared-cut filter.

Furthermore, an image plane IP is illustrated in the drawings. When the zoom lens is used for an image taking optical system of video cameras or digital still cameras, the image plane IP serves as an imaging surface of a solid-state image pickup element (a photoelectric conversion element), such as a charged coupled device (CCD) sensor or a complementary metal oxide semiconductor (CMOS) sensor.

When the zoom lens is used for an image taking optical system of silver-halide film cameras, the image plane IP corresponds to a film surface.

In aberration diagrams, "d" and "g" represent the d-line and g-line, respectively. "ΔM" and "ΔS" represent the meridional image plane and the sagittal image plane, respectively. The chromatic aberration of magnification is represented using the g-line with respect to the d-line. "ω" denotes the half angle of field. "Fno" denotes the F number. In spherical aberration diagrams, the ordinate represents the F number. In astigmatism diagrams, distortion aberration diagrams, and chromatic aberration of magnification diagrams, the ordinate represents the half angle of field.

In the following embodiments, the terms "wide-angle end" and "telephoto end" refer to zoom positions when a main lens unit for varying magnification is located at either ends of a mechanically movable range along a light axis.

When zooming is performed from the wide-angle end to the telephoto end, the lens units are moved in trajectories as indicated by arrows in the drawings.

In each of the following embodiments, when zooming is performed from the wide-angle end to the telephoto end, at least the second lens unit L2 is moved so that the distance between the first lens unit L1 and the second lens unit L2 at a telephoto end is greater than that at a wide-angle end.

In the zoom lenses according to the first to sixth embodiments and the eighth embodiment, when zooming is performed from the wide-angle end to the telephoto end, a second lens unit L2 is moved for performing primary magnification. In addition, a fourth lens unit L4 is moved in a locus convex towards the object side so that an image plane variation caused by the magnification is compensated for. Furthermore, the fourth lens unit L4 is used for focusing.

By moving the fourth lens unit L4 in a locus convex towards the object side, a space formed between the third lens unit L3 and the fourth lens unit L4 can be effectively used. Accordingly, the total lens length can be effectively reduced.

The fourth lens unit L4 is moved along a solid curve 4a and a dotted curve 4b in order to compensate for an image plane variation caused by the magnification when focusing on an object at infinity is carried out and short-distance focusing is carried out, respectively.

When focusing on an object at infinity is carried out, and subsequently, short-distance focusing is carried out, the fourth lens unit L4 is moved forward, as illustrated by an arrow 4c.

In the first to sixth embodiments and the eighth embodiment, when zooming or focusing is carried out, the first lens unit L1, the third lens unit L3, and the aperture stop SP are stationary along the light axis. However, in order to compensate for aberrations, the first lens unit L1, the third lens unit L3, and the aperture stop SP may be moved as needed.

According to the eighth embodiment, a zoom lens includes a fifth lens unit L5 having a weak refractive power so as to reduce a variation in the exit pupil when zooming is performed and reduce a variation in aberration when focusing is performed.

According to the seventh embodiment, all of the lens units in a zoom lens are moved when zooming is performed.

According to the seventh embodiment, when zooming is performed from the wide-angle end to the telephoto end, the second lens unit L2 is moved in a locus convex towards the image side. The first lens unit L1 and the third lens unit L3 are moved towards the object side so as to be located at positions closer to an object being focused on at a telephoto end than at a wide-angle end.

The fourth lens unit L4 is moved in a locus convex towards the object side when zooming is performed.

Since the first lens unit L1 is moved towards the object side so as to be located at a position closer to an object being focused on at a telephoto end than at a wide-angle end when zooming is performed, a high zoom ratio can be obtained while the total lens length is maintained short.

Since the third lens unit L3 is moved towards the object side so as to be located at a position closer to the object being focused on at a telephoto end than at a wide-angle end when zooming is performed, the third lens unit L3 can provide a large magnification effect. According to the seventh embodiment, the third lens unit L3 functions as a primary variable magnification lens unit.

In addition, since the first lens unit L1 having a positive refractive power is moved towards the object side, the second lens unit L2 can also have a variable magnification function. Thus, the zoom lens can provide a zoom ratio higher than or equal to five without significantly increasing the refractive powers of the first lens unit L1 and the second lens unit L2.

The zoom lens employs a rear focusing method in which the fourth lens unit L4 is moved along a light axis for focusing.

The fourth lens unit L4 is moved along a solid curve 4a and a dotted curve 4b in order to compensate for an image plane variation caused by zooming from a wide-angle end to a telephoto end when focusing on an object at infinity is carried out and short-distance focusing is carried out, respectively.

Like the above-described embodiment, according to the seventh embodiment, when focusing on an object at infinity is carried out, and subsequently, short-distance focusing is carried out at a telephoto end, the fourth lens unit L4 is moved forward, as illustrated by an arrow 4c.

According to the eighth embodiment, when zooming is performed, the aperture stop SP is moved together with the third lens unit L3. However, the aperture stop SP may be moved independently from the third lens unit L3. Alternatively, the aperture stop SP may be stationary. If the aperture stop SP is moved together with the third lens unit L3, the numbers of moved and movable units are reduced, and therefore, the mechanical structure can be easily simplified.

If the aperture stop SP is moved independently from the third lens unit L3, the diameter of a front lens can be advantageously reduced.

In contrast, if the aperture stop SP is stationary, an aperture unit need not be moved. Therefore, when zooming is performed, the driving torque of an actuator required for zooming can be small. Thus, power consumption can be advantageously reduced.

In the embodiments, the zoom lens includes four lens units or five lens units. However, an additional lens unit having a refractive power or a converter lens unit may be disposed on the object side of the first lens unit L1 or on the image side of the fourth lens unit L4 or the fifth lens unit L5, which is a final lens unit, as needed.

As noted above, according to each of the embodiments, the zoom lens includes, in order from an object side to an image side, the first lens unit having a positive refractive power, the second lens unit having a negative refractive power, and the rear component including at least one lens unit. When zooming is performed, at least the second lens unit is moved so that the distance between the first lens unit and the second lens unit at a telephoto end is greater than that at a wide-angle end.

According to the present invention, in such a zoom lens, the second lens unit L2 includes at least one negative lens element L2na made from a material that satisfies the following conditional expression:

$$Nd > 2.3 - 0.01 \cdot vd, \text{ and} \quad (1)$$

$$1.75 < Nd < 2.7, \quad (2)$$

where Nd is the index of refraction of the material for the d-line (wavelength=587.6 nm), and vd is the Abbe number.

Here, the Abbe number vd is expressed as follows:

$$vd = (Nd-1)/(NF-NC),$$

where Nd is the index of refraction of the material for the d-line (wavelength=587.6 nm), NF is the index of refraction of the material for the F-line (wavelength=486.1 nm), and NC is the index of refraction of the material for the C-line (wavelength=656.3 nm).

In each of the embodiments, the second lens unit L2 of the zoom lens includes a negative lens formed from an inorganic material having a high index of refraction that satisfies the above-described conditional expressions (1) and (2). Examples of such an inorganic material include a light-transmissive ceramic. In this way, the zoom lens according to each of the embodiments has a compact size, a high zoom ratio, and excellent optical performance over the entire zoom range.

If the index of refraction of the negative lens element L2na is less than the value of the right-hand side of conditional expression (1), chromatic dispersion caused by an off-axis ray becomes too high at a wide-angle end where the off-axis light ray passes through the negative lens element L2na at a high ray position. Accordingly, it is difficult to correct the chromatic aberration using a positive lens element in the second lens unit L2.

As a result, chromatic aberration of magnification increases at a wide-angle end.

In contrast, if the index of refraction of the negative lens element L2na is less than the lower limit of conditional expression (2), that is, if the index of refraction of the negative lens element L2na is too low, an amount of movement of the second lens unit L2 needs to be increased in order to obtain a sufficient zoom ratio using the second lens unit L2. As a result, it is difficult to reduce the size of the lens system.

However, if the index of refraction of the negative lens element L2na is greater than the upper limit of conditional expression (2), that is, if the index of refraction of the negative lens element L2na is too high, the negative lens element L2na cannot satisfactorily correct the Petzval sum to an undercorrection side. As a result, the curvature of field disadvantageously and significantly falls towards the undercorrection side.

When the zoom lens satisfies the above-described conditional expressions, the present invention can be achieved. Conditions for addressing a variety of technical issues about a zoom lens are described below.

Firstly, the negative lens element L2na satisfies the following conditional expression:

$$0.5 < f2na/f2 < 2.0 \quad (3)$$

where f2na is the focal length of the negative lens element L2na, and f2 is the focal length of the second lens unit L2. If the second lens unit L2 includes a plurality of negative lens elements formed from materials that satisfy conditional expressions (1) and (2), f2na represents the focal length of the negative lens element L2na having the highest index of refraction. As used herein, the term "highest index of refraction" refers to the largest absolute value of the index of refraction, that is, the smallest absolute value of the focal length.

Conditional expression (3) defines the responsibility of the negative lens element L2na concerning the index of refraction in the second lens unit L2.

If the focal length of the negative lens element L2na is less than the lower limit of conditional expression (3), that is, if the focal length of the negative lens element L2na is too small, an aberration caused by an off-axis ray in the negative lens element L2na at a wide angle end significantly increases. As a result, chromatic aberration of magnification increases at a wide-angle end, and therefore, a large barrel distortion aberration occurs.

In contrast, if the focal length of the negative lens element L2na is less than the lower limit of conditional expression (3), the degree of refractive power that is required from the other lens elements of the second lens unit L2 needs to be significantly increased. As a result, the number of lens elements of the second lens unit L2 increases, and therefore, the size of the entire lens system increases.

Secondly, in the case where the second lens unit L2 includes a negative lens element formed from a material that does not satisfy conditional expressions (1) and (2), that is, a negative lens element other than the negative lens element L2na, it is desirable that the following conditional expression is satisfied:

$$0.1 < f2na/f2nb < 1.0 \quad (4)$$

where f2nb is the focal length of a negative lens element other than the negative lens element L2na, that is, the focal length of a negative lens element L2nb having the highest index of refraction among negative lens elements formed from materials that do not satisfy conditional expression (1) and (2).

If the focal length f2na of the negative lens element L2na is decreased to a value lower than the lower limit of conditional expression (4), aberration of the negative lens element L2na caused by an off-axis ray becomes too large at a wide-angle end. As a result, chromatic aberration of magnification increases at a wide-angle end. Furthermore, a large barrel distortion aberration occurs.

However, if the focal length f2na of the negative lens element L2na is increased to a value higher than the upper limit of conditional expression (4), the negative lens element L2nb is largely responsible for refraction of the light.

Accordingly, in the negative lens L2nb, aberration caused by an off-axis ray becomes too large at a wide-angle end. As a result, chromatic aberration of magnification increases at a wide-angle end. Furthermore, a large barrel distortion aberration disadvantageously occurs.

Thirdly, in the case where the second lens unit L2 includes a plurality of lens elements, the following conditional expression is satisfied:

$$1.65 < N2ave < 2.3 \quad (5)$$

where N2ave is an average value of the indices of refraction of the materials of the lens elements of the second lens unit L2 for the d-line.

The second lens unit L2 is a lens unit responsible for variable magnification. Accordingly, in order to reduce the size of the entire lens system, the second lens unit L2 needs to have a high refractive power.

If the average value of the indices of refraction is decreased to a value lower than the lower limit of conditional expression (5), the curvature of each of lens elements of the second lens unit L2 increases (i.e., the radius of curvature decreases) too much. Accordingly, high-order aberration significantly occurs on each of surfaces of the lens elements. As a result, it is difficult to compensate for the aberration, and therefore, the optical performance deteriorates.

In contrast, if the average value of the indices of refraction is increased to a value higher than the upper limit of conditional expression (5), the second lens unit L2 cannot sufficiently correct the Petzval sum to an undercorrection side. As a result, the curvature of field disadvantageously and significantly falls towards the undercorrection side.

Fourthly, a negative lens element disposed so as to be the closest to an object being focused on satisfies the following conditional expression:

$$0.3 < (1/f2)/\Phi 21 < 1.8, \quad (6)$$

where $\Phi 21$ is a refractive power of an image-side surface of a negative lens element (a negative lens element G21 in the embodiments) disposed at a position closest to an object being focused on among negative lens elements of the second lens unit L2.

$\Phi 21$ is defined as follows:

$$\Phi 21 = (1 - n21)/R21,$$

where
n21 = the index of refraction of the material of the negative lens element G21 for the d-line, and
R21 = the radius of curvature of the image-side surface of the negative lens element G21.

Conditional expression (6) indicates a ratio of the refractive power (1/f2) of the second lens unit L2 to the refractive power ($\Phi 21$) of the image-side surface of the negative lens element G21 disposed so as to be closest to an object being focused on in the second lens unit L2.

At a wide-angle end, an off-axis light ray is incident on the negative lens element G21 of the second lens unit L2 disposed so as to be closest to an object being focused on at a position largely distant from the light axis. In addition, the off-axis light ray is incident on the negative lens element G21 from the outside to the inside at a large angle with respect to the light axis.

In contrast, axial rays pass through the first lens unit L1 having a positive refractive power and are collected. Thereafter, the axial rays enter the negative lens element G21.

Accordingly, at any zoom position, the axial rays do not have a large diameter. Thus, the effect of the negative lens element G21 on spherical aberration is small.

For these reasons, the negative lens element G21 should have a meniscus shape so that an off-axis ray has a small incident angle at a wide-angle end. In this way, the occurrence of distortion aberration and coma aberration can be reduced at a wide-angle end.

In addition, since the effect on spherical aberration is reduced at any zoom position, the negative lens element G21 can have a high negative refractive power. Accordingly, the second lens unit L2, which is movable lens unit, can have a high refractive power. As a result, a moving stroke required for zooming can be reduced, and therefore, the total lens length can be reduced.

If the refractive power Φ21 of the image-side surface of the negative lens element G21 is increased so that the ratio exceeds the lower limit of conditional expression (6), the dispersion effect of the image-side surface of the negative lens element G21 on an off-axis ray becomes too large at a wide-angle end where the ray height is high.

Accordingly, it is difficult for a positive lens element in the second lens unit L2 to compensate for chromatic aberration of magnification and coma aberration occurring on the image-side surface of the negative lens element G21 at a wide-angle end.

In contrast, if the refractive power Φ21 is decreased so that the ratio exceeds the upper limit of conditional expression (6), the second lens unit L2, which is a movable lens unit, cannot have a sufficient negative refractive power. As a result, a moving stroke required for zooming is increased, and therefore, it is difficult to reduce the size of the entire lens system.

The following conditions are satisfied for conditional expressions (2) to (6):

$$1.8 < Nd < 2.6, \quad (2a)$$

$$0.7 < f2na/f2 < 1.8, \quad (3a)$$

$$0.2 < f2na/f2nb < 0.9, \quad (4a)$$

$$1.7 < N2ave < 2.2, \text{ and} \quad (5a)$$

$$0.5 < (1/f2)/(\Phi21) < 1.6 \quad (6a)$$

In addition, the values in the following ranges further increase the effects intended by the above-described conditional expressions:

$$1.8 < Nd < 2.5, \quad (2b)$$

$$0.9 < f2na/f2 < 1.6, \quad (3b)$$

$$0.3 < f2na/f2nb < 0.8, \quad (4b)$$

$$1.75 < N2ave < 2.1, \text{ and} \quad (5b)$$

$$0.6 < (1/f2)/(\Phi21) < 1.4 \quad (6b)$$

The lens structure of the second lens unit L2 in each of the embodiments is described next.

In all of the embodiments, the second lens unit L2 includes at least two negative lens elements and at least one positive lens element.

The negative lens element L2na that satisfies conditional expressions (1) and (2) is located so as to be closest to an object being focused on among lens elements of the second lens unit L2. In each of the embodiments, the negative lens element G21 located so as to be closest to an object being focused on serves as the negative lens element L2na.

In each of the embodiments, the negative lens element G21 has a meniscus shape having a concave surface on the image side. At least one negative lens element and at least one positive lens element are disposed on an image side of the negative lens element L2na.

According to the first, second, and third embodiments, the following lens elements are disposed on an image side of the negative lens element G21 in order from an object side to the image side: a negative lens element G22 with a biconcave shape having two concave surfaces, a positive lens element G23 with a biconvex shape having two convex surfaces, and a negative lens element G24 with a biconcave shape having two concave surfaces.

According to the fourth embodiment, the following lens elements are disposed on an image side of the negative lens element G21 in order from an object side to the image side: a negative lens element G22 with a biconcave shape having two concave surfaces, a positive lens element G23 with a biconvex shape having two convex surfaces, and a negative lens element G24 having a concave surface on the object side.

According to the fifth, seventh, and eighth embodiments, the following lens elements are disposed on an image side of the negative lens element G21 in order from an object side to the image side: a negative lens element G22 with a biconcave shape having two concave surfaces and a positive lens element G23 having a convex surface on the object side.

According to the sixth embodiment, the following lens elements are disposed on an image side of the negative lens element G21 in order from an object side to the image side: a negative lens element G22 having a concave surface on the image side, a negative lens element G23 with a biconcave shape having two concave surfaces, and a positive lens element G24 having a convex surface on the object side.

The lens structure of the third lens unit L3 in each of the embodiments is described next.

In each of the embodiments, the third lens unit L3 includes at least one positive lens element and at least one negative lens element.

In addition, at least one of the surfaces of the positive lens elements in the third lens unit L3 is aspherical.

Particular structures of the embodiments are described next. In the following descriptions, lens elements are described in order from an object side to the image side unless otherwise noted.

According to the first embodiment, as illustrated in FIG. 1, the zoom lens includes the first lens unit L1 having a positive refractive power, the second lens unit L2 having a negative refractive power, the third lens unit L3 having a positive refractive power, and the fourth lens unit L4 having a positive refractive power.

When zooming is performed from a wide-angle end to a telephoto end, the second lens unit L2 is moved towards the image side so as to vary magnification. The fourth lens unit L4 is moved in a locus convex towards the object side so as to compensate for an image plane variation caused by the magnification.

The first lens unit L1 includes a cemented lens composed of a negative lens element G11 with a meniscus shape having a convex surface on the object side and a positive lens element G12. The first lens unit L1 further includes a positive lens element G13 with a meniscus shape having a convex surface on the object side.

By including the first lens unit L1 having three lens elements, the zoom lens can compensate for spherical aberration, axial chromatic aberration, and chromatic aberration of magnification while maintaining a high zoom ratio.

The second lens unit L2 includes four lens elements: a negative lens element G21 with a meniscus shape having a concave surface on the image side, the negative lens element G22 with a biconcave shape having two concave surfaces, the positive lens element G23 with a biconvex shape having two convex surfaces, and the negative lens element G24 with a biconcave shape having two concave surfaces. The negative lens element G21 corresponds to the above-described negative lens element L2na.

The material of the negative lens element G21 is the translucent ceramic LUMICERA (trademark) available from Murata Manufacturing Co., Ltd. The translucent ceramic LUMICERA satisfies conditional expressions (1) and (2).

LUMICERA has a high index of refraction nd of 2.095 for the d-line and an Abbe number vd of 29.4. Thus, LUMICERA has a relatively low dispersion characteristic.

In an nd-vd diagram, this material exhibits the property curve in a range in which that of a widely used optical glass material is not present. In general, the property curve of this material is located in a range located on the upper left of that of a widely used glass material.

By increasing the refractive power of the second lens unit L2 that serves as a variable magnification lens unit, the movement stroke of the variable magnification lens unit can be reduced when zooming is performed. Accordingly, the size of the entire lens system can be reduced.

To increase the refractive power of the second lens unit L2 and compensate for aberrations, it is advantageous to increase the refractive power of the negative lens element G21 having a low ray height when an axial ray passes therethrough, since spherical aberration is not significantly increased.

At a wide-angle end, an off-axis ray is incident on the negative lens element G21 at a steep angle at a high position of the negative lens element G21. In order to decrease the incident angle, the negative lens element G21 can have a meniscus shape and a concave surface on the image side. This shape is advantageous for compensating for coma aberration and distortion aberration occurring at a wide-angle end.

When the refractive power of the negative lens element G21 is increased, the curvature of the surface of the negative lens element G21 on the image side increases. However, in consideration of aberration caused by an off-axis ray at a zoom position other than the wide-angle end, the curvature has an upper limit.

If a material having a high index of refraction is used for the negative lens element G21, the curvature of the surface on the image side can be decreased.

However, for a widely used optical glass material, Abbe number thereof decreases as the index of refraction thereof increases. That is, as the index of refraction thereof increases, the glass material has a higher dispersion. Accordingly, in the negative lens element G21, chromatic aberration caused by an off-axis ray increases, and therefore, chromatic aberration of magnification increases at any zoom position.

To compensate for the chromatic aberration of magnification, the material of the positive lens element G23 needs to have a dispersion higher than that of the negative lens element G21.

That is, the material of the negative lens element G21 needs to be selected in relation to the material of the positive lens element G23. It is difficult for a widely used optical glass material to provide a high index of refraction that can be used for the negative lens element G21.

As noted above, if a material having a high index of refraction and a low dispersion that are different from those of a widely used material can be used for the negative lens element G21, the size of the entire lens system can be advantageously reduced. In addition, aberrations can be significantly reduced.

According to the first embodiment, a ceramic material having an index of refraction higher than that of a widely used material and a dispersion lower than that of a widely used material is used for the negative lens element G21. Thus, a zoom ratio higher than 30 and a small size of the entire lens system can be achieved while maintaining a high optical performance.

The third lens unit L3 includes a positive lens element G31 with a biconvex shape having two convex surfaces and a negative lens element G32 with a meniscus shape having a concave surface on the image side. By employing aspherical surfaces on the object side and the image side, the positive lens element G31 can satisfactorily compensate for spherical aberration.

The fourth lens unit L4 is composed of a cemented lens formed by bonding a positive lens element G41 with a biconvex shape having two convex surfaces to a negative lens element G42 with a meniscus shape having a convex surface on the image side. By employing the cemented lens composed of the positive lens element G41 and the negative lens element G42, a variation in aberration can be reduced when zooming or focusing is performed.

The second embodiment is described next with reference to FIG. 5. The basic lens structure of the second embodiment including reference numerals of the indices of refraction of each lens unit and movement conditions of each lens unit during zooming is similar to that of the first embodiment illustrated in FIG. 1.

The negative lens element G21 of the second lens unit L2 corresponds to the above-described negative lens element L2na. The negative lens element G21 is formed from an yttrium aluminum garnet ceramic, which is a material that satisfies conditional expressions (1) and (2) in terms of the index of refraction and Abbe number.

Yttrium aluminum garnet is simply referred to as "YAG". YAG is oxide that is light-transmissive in a visible light range. YAG is represented as $Y_3Al_5O_{12}$.

YAG has an optical characteristic defined by the index of refraction of 1.83 and an Abbe number of 59. In an nd-vd diagram, the characteristic curve is located in a range in which that of a widely used optical glass material is not present. In general, the characteristic curve is located in a range located on the upper left of that of a widely used glass material.

That is, YAG has a dispersion lower than that of a widely used optical glass material having the same index of refraction.

According to the second embodiment, a YAG ceramic having an optical characteristic that widely used optical glass materials do not have is used for the negative lens element G21. Thus, a zoom ratio higher than 30 and a small size of the entire lens system can be achieved while maintaining a high optical performance.

Even when YAG is a single crystal, YAG has an optical characteristic similar to that of a ceramic. Accordingly, even when the single crystal is used for the negative lens element G21 in place of a ceramic, the same advantage can be provided. Note that the above-described index of refraction and Abbe number slightly vary in accordance with conditions during manufacturing the ceramic.

The third embodiment is described next in more detail with reference to FIG. 9. The basic lens structure is similar to that of the first embodiment.

Each of the negative lens element G21 and the negative lens element G22 of the second lens unit L2 corresponds to the above-described negative lens element L2na. The index of refraction and the Abbe number of the material of each of the negative lens element G21 and the negative lens element G22 satisfy conditional expressions (1) and (2). Thus, the refractive power of the second lens unit L2 can be increased while various aberrations are compensated for. In this way, a zoom ratio higher than 35 and a small size of the entire lens system can be achieved at the same time.

The fourth embodiment is described next in more detail with reference to FIG. 13. The basic lens structure is similar to that of the first embodiment.

Unlike the first embodiment, according to the fourth embodiment, the third lens unit L3 includes three lens elements. In addition, an aperture stop SP is disposed in the third lens unit L3.

When the aperture stop SP is disposed in the third lens unit L3, the distance between the second lens unit L2 and the third lens unit L3 at a telephoto end can be reduced, as compared with the case where the aperture stop SP is disposed on the object side of the third lens unit L3. Thus, the total length can be easily reduced.

The negative lens element G21 of the second lens unit L2 corresponds to the above-described negative lens element L2na. Like the first embodiment, the translucent ceramic LUMICERA (trademark) available from Murata Manufacturing Co., Ltd is used for the material of the negative lens element G21.

The fifth embodiment is described next in more detail with reference to FIG. 17. The basic lens structure is similar to that of the fourth embodiment.

Unlike the fourth embodiment, according to the fifth embodiment, the second lens unit L2 includes three lens elements. Like the fourth embodiment, an aperture stop SP is disposed in the third lens unit L3.

By disposing three lens elements in the second lens unit L2, the thickness of the second lens unit L2 can be reduced, and therefore, the total lens length can be reduced.

Since the weight of the second lens unit L2, which is a movable lens unit, is reduced, the torque of a driving actuator can be reduced. Accordingly, the size of the actuator can be reduced. In addition, power consumption of the actuator can be easily reduced.

The negative lens element G21 of the second lens unit L2 corresponds to the above-described negative lens element L2na. The index of refraction and the Abbe number of the material of the negative lens element G21 satisfy conditional expressions (1) and (2). Thus, the refractive power of the second lens unit L2 can be increased while compensating for a variety of aberrations. In this way, a high zoom ratio of about 10 and a small size of the entire lens system can be achieved.

The sixth embodiment is described next in more detail with reference to FIG. 21. The basic lens structure is similar to that of the fourth embodiment.

Unlike the fourth embodiment, according to the sixth embodiment, the second lens unit L2 includes the positive lens element G24 at a position closest to an image, and the third lens unit L3 includes the aperture stop SP at a position closest to an object being focused on. Accordingly, the shapes of the lens elements of the second lens unit L2 are different from those in the fourth embodiment.

Since the aperture stop SP is disposed in the third lens unit L3 at a position closest to an object being focused on, the distance between the first lens unit L1 and the position of the entrance pupil can be reduced. Thus, the diameter of a front lens can be advantageously reduced.

The second lens unit L2 includes four lens elements: the negative lens element G21 with a meniscus shape having a concave surface on the image side, the negative lens element G22 with a meniscus shape having a concave surface on the image side, the negative lens element G23 with a meniscus shape having a concave surface on the object side, and the positive lens element G24 with a meniscus shape having a convex surface on the object side.

The negative lens element G21 of the second lens unit L2 corresponds to the above-described negative lens element L2na. The index of refraction and the Abbe number of the material of the negative lens element G21 satisfy conditional expressions (1) and (2). Like the second embodiment, the material is a YAG ceramic.

Thus, the refractive power of the second lens unit L2 can be increased while compensating for a variety of aberrations. In this way, a high zoom ratio of about 10 and a small size of the entire lens system can be achieved while maintaining a high optical performance.

The seventh embodiment is described next in more detail with reference to FIG. 25. The arrangement of refractive powers of the lens units is similar to that of the first embodiment. According to the seventh embodiment, the zoom lens performs zooming by moving all of the lens units.

The first lens unit L1 includes a cemented lens having a positive refractive power. The cemented lens is composed of the negative lens element G11 with a meniscus shape having a convex surface on the object side and the positive lens element G12 bonded to the negative lens element G11. By employing the cemented lens composed of the negative lens element G11 and the positive lens element G12, chromatic aberration occurring in the first lens unit L1 can be reduced.

The second lens unit L2 includes three lens elements: a negative lens G21 with a meniscus shape having a concave surface on the image side, the negative lens element G22 with a biconcave shape having two concave surfaces, and the positive lens element G23 with a biconvex shape having a convex surface on the object side.

The negative lens element G21 of the second lens unit L2 corresponds to the above-described negative lens element L2na. The index of refraction and the Abbe number of the material of the negative lens element G21 satisfy conditional expressions (1) and (2).

Thus, the refractive power of the second lens unit L2 can be increased while compensating for a variety of aberrations. In this way, a high zoom ratio more than or equal to five and a small size of the entire lens system can be achieved while maintaining a high optical performance.

The third lens unit L3 includes two lens elements: the positive lens element G31 with a biconvex shape having two convex surfaces and a cemented lens having a negative resultant refractive power. The cemented lens is formed by bonding a positive lens element G32 with a meniscus shape having a convex surface on the object side to a negative lens element G33 with a meniscus shape having a concave surface on the image side.

By employing an aspherical shape for each of the two surfaces of the positive lens element G31, spherical aberration can be satisfactorily reduced.

The fourth lens unit L4 includes the positive lens element G41 having a convex surface towards an object side.

According to the eighth embodiment, as illustrated in FIG. 29, the zoom lens includes the first lens unit L1 having a positive refractive power, the second lens unit L2 having a negative refractive power, the third lens unit L3 having a positive refractive power, the fourth lens unit L4 having a positive refractive power, and the fifth lens unit L5 having a weak refractive power.

When zooming is performed from the wide-angle end to the telephoto end, the second lens unit L2 is moved towards an image side so as to perform primary magnification. In addition, a fourth lens unit L4 is moved in a locus convex towards the object side so that an image plane variation caused by the magnification is compensated for.

The fifth lens unit L5 having a weak refractive power is disposed between the fourth lens unit L4 and the image plane IP. The fifth lens unit L5 reduces a variation in the exit pupil distance caused by zooming and a variation in aberration caused by focusing performed by moving the fourth lens unit L4.

According to the eighth embodiment, the fifth lens unit L5 is stationary during zooming. However, the fifth lens unit L5 may be moved during zooming. In addition, according to the eighth embodiment, the fifth lens unit L5 has a positive refractive power. However, even when the fifth lens unit L5 has a negative refractive power, the above-described advantage can be provided.

Let f4 and f5 denote the focal lengths of the fourth lens unit L4 and the fifth lens unit L5, respectively. Then, the refractive power of the fifth lens unit L5 satisfies:

$-0.7 < f4/f5 < 0.7$.

Further, the following condition is satisfied:

$-0.5 < f4/f5 < 0.5$.

Still further, the following condition is satisfied:

$-0.3 < f4/f5 < 0.3$.

Like the fourth embodiment, the aperture stop SP is disposed in the third lens unit L3.

The negative lens element G21 of the second lens unit L2 corresponds to the above-described negative lens element L2na. The index of refraction and the Abbe number of the material of the negative lens element G21 satisfy conditional expressions (1) and (2). Thus, the refractive power of the second lens unit L2 can be increased while a variety of aberrations are compensated for. In this way, a high zoom ratio of about 10 and a small size of the entire lens system can be achieved while maintaining a high optical performance.

First to eighth numerical embodiments corresponding to the above-described embodiments are described below.

In the following numerical embodiments, "i" denotes the order of an optical surface or an optical element numbered from the object side. "Ri" denotes the radius of curvature of the ith optical surface, and "Di" denotes a distance between the ith surface and the (i+1)th surface along the light axis. "Ni" and "vi" denote the index of refraction and the Abbe number of a material of the ith optical element for the d-line, respectively.

The shape of an aspherical surface is expressed by the following equation:

$$X = \frac{(1/R)H^2}{1+\sqrt{1-(1+K)(H/R)^2}} + BH^4 + CH^6 + DH^8 + EH^{10} + B'H^5 + C'H^7 + D'H^9 + E'H^{11} + F'H^{13}$$

where

X is an amount of displacement from the surface vertex in the light axis direction at the height H from the light axis, k is the conic constant, B, C, D, E, B', C', D', E', and F' are aspherical coefficients at respective orders, and R is the paraxial radius of curvature.

In the following tables and in each aspherical coefficient, "e±Z" means "×10$^{±Z}$" Table 1 illustrates values corresponding to the above-described conditional expressions in each of the numerical embodiments. Here, "f" denotes the focal length. "Fno" denotes the F number. "ω" denotes the half angle of field.

First Numerical Embodiment f=3.53–13.64–120.0, Fno=1.44–2.17–4.42, and 2ω=66.8°–18.6°–2.1°

| i | Ri | Di | Ni | vi |
|---|---|---|---|---|
| 1 | 49.775 | 1.60 | 1.84666 | 23.9 |
| 2 | 23.500 | 7.00 | 1.69680 | 55.5 |
| 3 | −6699.051 | 0.15 | | |
| 4 | 22.626 | 3.30 | 1.77250 | 49.6 |
| 5 | 52.084 | variable | | |
| 6 | 30.179 | 0.70 | 2.095 | 29.4 |
| 7 | 4.994 | 2.65 | | |
| 8 | −20.214 | 0.55 | 1.88300 | 40.8 |
| 9 | 33.727 | 0.47 | | |
| 10 | 9.977 | 2.50 | 1.92286 | 18.9 |
| 11 | −30.861 | 0.18 | | |
| 12 | −18.059 | 0.50 | 1.77250 | 49.6 |
| 13 | 17.949 | variable | | |
| 14 | Aperture | 0.60 | | |
| 15 | 11.143 (Aspherical Surface) | 5.50 | 1.69350 | 53.2 |
| 16 | −18.363 (Aspherical Surface) | 0.15 | | |
| 17 | 65.446 | 0.80 | 1.84666 | 23.9 |
| 18 | 11.880 | variable | | |
| 19 | 14.015 | 3.80 | 1.51742 | 52.4 |
| 20 | −7.552 | 0.50 | 1.84666 | 23.9 |
| 21 | −12.718 | variable | | |
| 22 | ∞ | 2.5 | 1.51633 | 64.1 |
| 23 | ∞ | | | |

| | Focal Length | | |
|---|---|---|---|
| Variable Distance | 3.54 | 13.64 | 120.00 |
| D5 | 0.88 | 14.18 | 22.68 |
| D13 | 24.44 | 11.14 | 2.64 |
| D18 | 12.54 | 6.58 | 15.59 |
| D21 | 5.76 | 11.71 | 2.71 |

Aspherical Surface
R15 k=−8.17593e−01 B'=−1.94933e−06 C'=−2.81176e−08 D'=3.33386e−09 E'=−4.50518e−11 F'=6.97919e−14
R16 k=−1.10625e+01 B'=−3.77972e−06 C'=−2.74413e−07 D'=−3.66539e−09 E'=7.81978e−12

Second Numerical Embodiment f=3.57–14.16–120.9, Fno=1.55–2.31–4.49, and 2ω=66.2°–18.0°–2.1°

| i | Ri | Di | Ni | vi |
|---|---|---|---|---|
| 1 | 56.036 | 1.55 | 1.84666 | 23.9 |
| 2 | 23.801 | 7.05 | 1.69680 | 55.5 |
| 3 | −662.011 | 0.15 | | |
| 4 | 22.898 | 3.40 | 1.77250 | 49.6 |
| 5 | 56.486 | variable | | |
| 6 | 40.012 | 0.70 | 1.83 | 59 |
| 7 | 4.757 | 2.80 | | |

-continued

| | | | | |
|---|---|---|---|---|
| 8 | −17.883 | 0.55 | 1.88300 | 40.8 |
| 9 | 23.729 | 0.56 | | |
| 10 | 9.411 | 2.75 | 1.80518 | 25.4 |
| 11 | −12.688 | 0.09 | | |
| 12 | −11.170 | 0.60 | 1.80400 | 46.6 |
| 13 | 18.943 | variable | | |
| 14 | Aperture | 0.60 | | |
| 15 | 10.914 (Aspherical Surface) | 4.75 | 1.69350 | 53.2 |
| 16 | −20.123 (Aspherical Surface) | 0.20 | | |
| 17 | 56.630 | 0.80 | 1.80518 | 25.4 |
| 18 | 11.418 | variable | | |
| 19 | 15.705 | 3.45 | 1.57099 | 50.8 |
| 20 | −7.650 | 0.50 | 1.84666 | 23.9 |
| 21 | −14.297 | variable | | |
| 22 | ∞ | 2.55 | 1.51633 | 64.1 |
| 23 | ∞ | | | |

| | Focal Length | | |
|---|---|---|---|
| Variable Distance | 3.57 | 14.16 | 120.90 |
| D5 | 0.95 | 14.26 | 22.76 |
| D13 | 23.96 | 10.66 | 2.15 |
| D18 | 12.34 | 6.28 | 15.73 |
| D21 | 6.10 | 12.16 | 2.71 |

Aspherical Surface

R15 $k=-7.85117e-01$ $B'=-5.54389e-06$ $C'=-8.84334e-09$ $D'=2.50686e-09$ $E'=1.91750e-11$ $F'=-1.42887e-12$

R16 $k=-1.35260e+01$ $B'=-1.05015e-05$ $C'=4.01295e-07$ $D'=-2.57908e-09$ $E'=-6.21843e-11$

Third Numerical Embodiment $f=3.53-13.76-125.0$, $Fno=1.44-2.17-4.64$, and $2\omega=67.1°-18.5°-2.0°$

| i | Ri | Di | Ni | vi |
|---|---|---|---|---|
| 1 | 48.489 | 1.60 | 1.84666 | 23.9 |
| 2 | 23.106 | 7.00 | 1.69680 | 55.5 |
| 3 | 2400.643 | 0.15 | | |
| 4 | 22.655 | 3.30 | 1.77250 | 49.6 |
| 5 | 53.066 | variable | | |
| 6 | 30.648 | 0.70 | 2.18 | 30.0 |
| 7 | 5.151 | 2.42 | | |
| 8 | −21.315 | 0.55 | 1.95 | 45.0 |
| 9 | 51.723 | 0.47 | | |
| 10 | 9.862 | 2.20 | 1.92286 | 18.9 |
| 11 | −34.891 | 0.22 | | |
| 12 | −17.566 | 0.50 | 1.77250 | 49.6 |
| 13 | 17.516 | variable | | |
| 14 | Aperture | 0.60 | | |
| 15 | 10.858 (Aspherical Surface) | 5.50 | 1.69350 | 53.2 |
| 16 | −16.148 (Aspherical Surface) | 0.15 | | |
| 17 | −287.872 | 0.80 | 1.76182 | 26.5 |
| 18 | 11.959 | variable | | |
| 19 | 13.799 | 3.80 | 1.51742 | 52.4 |
| 20 | −7.394 | 0.50 | 1.84666 | 23.9 |
| 21 | −12.449 | variable | | |
| 22 | ∞ | 2.55 | 1.51633 | 64.1 |
| 23 | ∞ | | | |

| | Focal Length | | |
|---|---|---|---|
| Variable Distance | 3.53 | 13.76 | 125.00 |
| D5 | 0.88 | 14.17 | 22.66 |
| D13 | 24.34 | 11.05 | 2.56 |
| D18 | 13.00 | 6.85 | 16.26 |
| D21 | 5.97 | 12.12 | 2.71 |

Aspherical Surface

R15 $k=-6.70844e-01$ $B'=-2.43294e-06$ $C'=-5.50811e-08$ $D'=4.11454e-09$ $E'=-5.59271e-11$ $F'=2.33980e-13$

R16 $k=-9.42350e+00$ $B'=-5.62082e-06$ $C'=3.36368e-07$ $D'=-4.59240e-09$ $E'=2.09729e-11$

Fourth Numerical Embodiment $f=4.80-11.25-47.99$, $Fno=1.85-2.03-2.38$, and $2\omega=60.4°-26.3°-6.2°$

| i | Ri | Di | Ni | vi |
|---|---|---|---|---|
| 1 | 44.565 | 1.10 | 1.84666 | 23.9 |
| 2 | 20.908 | 4.40 | 1.60311 | 60.6 |
| 3 | −172.605 | 0.18 | | |
| 4 | 18.059 | 2.65 | 1.77250 | 49.6 |
| 5 | 50.525 | variable | | |
| 6 | 25.959 | 0.60 | 2.095 | 29.4 |
| 7 | 6.354 | 2.15 | | |
| 8 | −12.433 | 0.65 | 1.65844 | 50.9 |
| 9 | 14.645 | 1.00 | | |
| 10 | 13.771 | 2.25 | 1.80518 | 25.4 |
| 11 | −10.342 | 0.08 | | |
| 12 | −9.193 | 0.65 | 1.77250 | 49.6 |
| 13 | −327.886 | variable | | |
| 14 | 7.636 (Aspherical Surface) | 2.35 | 1.69350 | 53.2 |
| 15 | −90.047 | 1.26 | | |
| 16 | Aperture | 2.20 | | |
| 17 | 44.405 | 0.65 | 1.84666 | 23.9 |
| 18 | 6.208 | 0.60 | | |
| 19 | 18.775 | 1.30 | 1.60311 | 60.6 |
| 20 | −39.915 | variable | | |
| 21 | 9.078 | 2.70 | 1.72000 | 50.2 |
| 22 | −10.476 | 0.55 | 1.84666 | 23.9 |
| 23 | −42.769 | variable | | |
| 24 | ∞ | 2.40 | 1.51633 | 64.1 |
| 25 | ∞ | | | |

| | Focal Length | | |
|---|---|---|---|
| Variable Distance | 4.80 | 11.25 | 49.99 |
| D5 | 0.60 | 7.99 | 15.37 |
| D13 | 15.56 | 8.17 | 0.79 |
| D20 | 3.51 | 1.76 | 6.21 |
| D23 | 3.62 | 5.38 | 0.93 |

Aspherical Surface

R14 $k=-1.06835e+00$ $B=5.14480e-05$ $C=3.21192e-07$ $D=4.22231e-09$ $E=-2.91408e-10$

Fifth Numerical Embodiment f=4.84–11.48–46.54, Fno=1.85–2.01–2.37, and 2ω=60.0°–25.9°–6.5°

| i | Ri | Di | Ni | vi |
|---|---|---|---|---|
| 1 | 43.800 | 1.05 | 1.84666 | 23.9 |
| 2 | 20.883 | 4.10 | 1.60311 | 60.6 |
| 3 | −1056.466 | 0.18 | | |
| 4 | 19.890 | 2.65 | 1.77250 | 49.6 |
| 5 | 61.879 | variable | | |
| 6 | 41.696 | 0.60 | 2.000 | 40.0 |
| 7 | 6.000 | 2.00 | | |
| 8 | −18.236 | 0.65 | 1.62299 | 58.2 |
| 9 | 16.608 | 1.20 | | |
| 10 | 13.462 | 1.30 | 1.92286 | 18.9 |
| 11 | 50.962 | variable | | |
| 12 | 9.206 (Aspherical Surface) | 2.25 | 1.69350 | 53.2 |
| 13 | −10264.8 | 1.26 | | |
| 14 | Aperture | 2.20 | | |
| 15 | 26.089 | 0.65 | 1.84666 | 23.9 |
| 16 | 8.202 | 0.60 | | |
| 17 | 29.565 | 1.25 | 1.69680 | 55.5 |
| 18 | −39.192 | variable | | |
| 19 | 11.878 | 2.60 | 1.72000 | 50.2 |
| 20 | −10.473 | 0.55 | 1.84666 | 23.9 |
| 21 | −42.769 | variable | | |
| 22 | ∞ | 2.40 | 1.51633 | 64.1 |
| 23 | ∞ | | | |

| | Focal Length | | |
|---|---|---|---|
| Variable Distance | 4.84 | 11.48 | 46.54 |
| D5 | 0.60 | 9.10 | 17.60 |
| D11 | 17.66 | 9.16 | 0.66 |
| D18 | 4.33 | 2.20 | 5.77 |
| D26 | 4.85 | 6.98 | 3.41 |

Aspherical Surface

R12 k=2.31410e−01 B=−1.87458e−04 C=−1.24981e−06 D=−1.18548e−08 E=−2.91408e−10

Sixth Numerical Embodiment f=5.00–11.68–50.00, Fno=1.85–1.97–2.45, and 2ω=58.4°–25.6°–6.0°

| i | Ri | Di | Ni | vi |
|---|---|---|---|---|
| 1 | 44.453 | 1.15 | 1.84666 | 23.9 |
| 2 | 20.185 | 4.35 | 1.60311 | 60.6 |
| 3 | −718.607 | 0.18 | | |
| 4 | 19.645 | 2.80 | 1.77250 | 49.6 |
| 5 | 67.223 | variable | | |
| 6 | 59.944 | 0.60 | 1.83 | 59 |
| 7 | 5.791 | 1.45 | | |
| 8 | 15.169 | 0.60 | 1.69680 | 55.5 |
| 9 | 10.267 | 1.30 | | |
| 10 | −17.431 | 0.60 | 1.69680 | 55.5 |
| 11 | 127.439 | 0.10 | | |
| 12 | 11.547 | 1.20 | 1.92286 | 18.9 |
| 13 | 26.813 | variable | | |
| 14 | Aperture | 1.75 | | |
| 15 | 6.978 (Aspherical Surface) | 2.80 | 1.69350 | 53.2 |
| 16 | 173.137 | 1.60 | | |
| 17 | 20.677 | 0.60 | 1.84666 | 23.9 |
| 18 | 6.078 | 0.80 | | |
| 19 | 18.656 | 1.20 | 1.69680 | 55.5 |
| 20 | −50.826 | variable | | |
| 21 | 10.192 | 1.95 | 1.69680 | 55.5 |
| 22 | −59.975 | 0.55 | 1.84666 | 23.9 |
| 23 | 83.818 | variable | | |
| 24 | ∞ | 2.50 | 1.51633 | 64.1 |
| 25 | ∞ | | | |

| | Focal Length | | |
|---|---|---|---|
| Variable Distance | 5.00 | 11.68 | 50.00 |
| D5 | 0.75 | 8.74 | 16.72 |
| D13 | 17.70 | 9.72 | 1.73 |
| D20 | 4.34 | 2.38 | 8.17 |
| D23 | 5.53 | 7.48 | 1.69 |

Aspherical Surface

R15 k=4.83478e−02 B=−2.80855e−04 C=−1.59886e−06 D=−1.34324e−07

Seventh Numerical Embodiment f=7.59–20.82–43.53, Fno=2.79–3.49–4.90, and 2ω=64.6°–25.1°–12.0°

| i | Ri | Di | Ni | vi |
|---|---|---|---|---|
| 1 | 25.572 | 1.15 | 1.84666 | 23.9 |
| 2 | 19.293 | 3.80 | 1.71300 | 53.9 |
| 3 | 105.981 | variable | | |
| 4 | 22.029 | 0.85 | 2.18 | 30.0 |
| 5 | 8.167 | 4.50 | | |
| 6 | −18.631 | 0.75 | 1.58313 | 59.4 |
| 7 | 32.579 | 0.65 | | |
| 8 | 20.340 | 1.75 | 1.92286 | 18.9 |
| 9 | 947.341 | variable | | |
| 10 | Aperture | 0.80 | | |
| 11 | 10.747 (Aspherical Surface) | 2.90 | 1.58313 | 59.4 |
| 12 | −22.934 (Aspherical Surface) | 0.20 | | |
| 13 | 6.138 | 2.40 | 1.48749 | 70.2 |
| 14 | 12.620 | 0.85 | 1.84666 | 23.9 |
| 15 | 4.837 | variable | | |
| 16 | 12.101 | 2.50 | 1.48749 | 70.2 |
| 17 | 112.832 | variable | | |
| 18 | ∞ | 1.25 | 1.51633 | 64.1 |
| 19 | ∞ | | | |

| | Focal Length | | |
|---|---|---|---|
| Variable Distance | 7.59 | 20.82 | 43.53 |
| D3 | 0.30 | 12.21 | 17.82 |
| D9 | 22.41 | 6.99 | 1.98 |
| D15 | 9.11 | 12.08 | 24.82 |
| D17 | 3.05 | 6.60 | 3.88 |

Aspherical Surface

R11 k=−1.07677e+00 B=−3.09467e−05 C=−9.71833e−07 D=−1.71799e−08 E=−1.11015e−09

R12 k=−1.37996e+00 B=2.41367e−05 C=−7.60626e−07 D=−5.98159e−08

Eighth Numerical Embodiment f=4.83–11.60–46.54, Fno=1.85–2.02–2.29, and 2ω=60.0°–25.9°–6.5°

| i | Ri | Di | Ni | vi |
|---|---|---|---|---|
| 1 | 39.217 | 1.05 | 1.84666 | 23.9 |
| 2 | 20.995 | 4.15 | 1.60311 | 60.6 |
| 3 | −3616.704 | 0.18 | | |
| 4 | 20.082 | 2.70 | 1.69680 | 55.5 |
| 5 | 64.641 | variable | | |
| 6 | 45.215 | 0.60 | 2.000 | 40.0 |
| 7 | 6.105 | 2.00 | | |
| 8 | −17.564 | 0.65 | 1.48749 | 70.2 |
| 9 | 15.046 | 1.00 | | |
| 10 | 11.788 | 1.40 | 1.94595 | 18.0 |
| 11 | 27.758 | variable | | |
| 12 | 8.873 (Aspherical Surface) | 2.25 | 1.69350 | 53.2 |
| 13 | 57.403 | 1.26 | | |
| 14 | Aperture | 2.15 | | |
| 15 | 24.703 | 0.65 | 1.84666 | 23.9 |
| 16 | 8.465 | 0.60 | | |
| 17 | 30.758 | 1.25 | 1.69680 | 55.5 |
| 18 | −27.998 | variable | | |
| 19 | 11.714 | 2.30 | 1.77250 | 49.6 |
| 20 | −16.115 | 0.55 | 1.80809 | 22.8 |
| 21 | 1742.763 | variable | | |
| 22 | 39.162 | 1.10 | 1.48749 | 70.2 |
| 23 | 79.130 | 1.00 | | |
| 24 | ∞ | 2.40 | 1.51633 | 64.1 |
| 25 | ∞ | | | |

| | Focal Length | | |
|---|---|---|---|
| Variable Distance | 4.83 | 11.60 | 46.54 |
| D5 | 0.60 | 9.19 | 17.78 |
| D11 | 17.84 | 9.52 | 0.66 |
| D18 | 4.01 | 1.97 | 6.26 |
| D21 | 3.47 | 5.50 | 1.21 |

Aspherical Surface

R12 k=2.00416e−01 B=−1.78751e−04 C=−1.60758e−06 D=−7.35439e−09 E=−2.91408e−10

In each of the embodiments, a high-performance zoom lens is achieved that can be incorporated in a high-resolution digital still cameras and digital video cameras. The high magnification and compact zoom lens can sufficiently correct spherical aberration, coma aberration, a curvature of field, axial chromatic aberration, and chromatic aberration of magnification.

An embodiment of a digital still camera that includes one of the zoom lenses according to the above-described embodiments as an imaging optical system is described next with reference to FIG. 33.

As illustrated in FIG. 33, the digital still camera includes a camera body 20 and an imaging optical system 21 including the zoom lens according to one of the first to eighth embodiments.

The digital still camera further includes a solid-state image pickup element (a photoelectric conversion element) 22, such as a CCD sensor or a CMOS sensor, and a memory 23. The solid-state image pickup element 22 is incorporated in the camera body 20. The solid-state image pickup element 22 receives light of an object image formed by the imaging optical system 21. The memory 23 stores information corresponding to the object image photoelectrically converted by the solid-state image pickup element 22.

The digital still camera further includes a finder 24. The finder 24 includes, for example, a liquid crystal display panel. The finder 24 is used for viewing the object image formed on the solid-state image pickup element 22.

An embodiment of a video camera that includes one of the zoom lenses according to the above-described embodiments as an imaging optical system is described next with reference to FIG. 34.

As illustrated in FIG. 34, the video camera includes a camera body 10 and an imaging optical system 11 including the zoom lens according to one of the first to eighth embodiments.

The video camera further includes a solid-state image pickup element (a photoelectric conversion element) 12, such as a CCD sensor or a CMOS sensor, and a memory 13. The solid-state image pickup element 12 is incorporated in the camera body 10. The solid-state image pickup element 12 receives light of an object image formed by the imaging optical system 11. The memory 13 stores information corresponding to the object image photoelectrically converted by the solid-state image pickup element 12.

The video camera further includes a finder 14. The finder 14 is used for viewing the object image formed on a display device (not shown).

The display device includes, for example, a liquid crystal display panel. The object image formed on the solid-state image pickup element 12 is displayed on the display device.

As noted above, by applying the zoom lens according to one of the above-described embodiments to an image pickup apparatus, such as a digital still camera or a video camera, a compact and high-performance image pickup apparatus can be achieved.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-037816 filed Feb. 19, 2007, which is hereby incorporated by reference herein in its entirety.

TABLE 1

| Conditional Expression | First Numerical Embodiment | Second Numerical Embodiment | Third Numerical Embodiment | Fourth Numerical Embodiment | Fifth Numerical Embodiment | Sixth Numerical Embodiment | Seventh Numerical Embodiment | Eighth Numerical Embodiment |
|---|---|---|---|---|---|---|---|---|
| (1) (2) N2na | 2.095 | 1.83 | 2.18/1.95 | 2.095 | 2.00 | 1.83 | 2.18 | 2.00 |
| (1) vd2na | 29.4 | 59 | 30.0/45.0 | 29.4 | 40.0 | 59 | 30.0 | 40.0 |
| (3) | 1.309 | 1.535 | 1.276 | 1.318 | 1.095 | 1.200 | 1.006 | 1.064 |
| (4) | 0.479 | 0.758 | 0.472 | 0.772 | 0.510 | 0.353 | 0.563 | 0.431 |
| (5) | 1.918 | 1.831 | 1.956 | 1.833 | 1.849 | 1.787 | 1.895 | 1.811 |
| (6) | 1.076 | 1.341 | 1.046 | 0.980 | 0.929 | 1.079 | 0.612 | 0.913 |

What is claimed is:

1. A zoom lens system comprising, in order from an object side to an image side:
   a first lens unit having a positive optical power;
   a second lens unit having a negative optical power, the second lens unit being movable so that a distance between the first lens unit and the second lens unit at a telephoto end is greater than that at a wide-angle end; and
   a rear lens component including at least one lens unit,
   wherein the second lens unit includes a negative lens element made of a material satisfying the first conditions:

$Nd>2.3-0.01\nu d$, and $1.75<Nd<2.7$, where Nd is an index of refraction of the material for the d-line, and νd is the Abbe number expressed by:

$\nu d=(Nd-1)/(NF-NC)$ where NF is an index of refraction of the material for the F-line, and NC is an index of refraction of the material for the C-line.

2. The zoom lens system according to claim 1, wherein the following condition is satisfied:

$0.5<f2na/f2<2.0$, where f2na is a focal length of the negative lens element, and f2 is a focal length of the second lens unit.

3. The zoom lens system according to claim 1, wherein the second lens unit includes a negative lens element formed from a material that satisfies the first conditions and a negative lens element formed from a material that does not satisfy the first conditions, and wherein the following condition is satisfied:

$0.1<f2na/f2nb<1.0$, where f2na is a focal length of the negative lens element formed from a material that satisfies the first conditions and f2nb is a focal length of the negative lens element formed from a material that does not satisfy the first conditions.

4. The zoom lens system according to claim 1, wherein the second lens unit includes a plurality of lens elements, and the following condition is satisfied:

$1.65<N2ave<2.3$, where N2ave is an average value of the indices of refraction of materials of the plurality of lens elements.

5. The zoom lens system according to claim 1, wherein the negative lens element is located in the second lens unit at the position closest to an object side.

6. The zoom lens system according to claim 5, wherein the following condition is satisfied:

$0.3<(1/f2)/(\Phi 21<1.8$, where $\Phi 21$ is a refractive power of an image-side surface of the negative lens element, and f2 is a focal length of the second lens unit.

7. The zoom lens system according to claim 5, wherein the second lens unit includes at least one negative lens element and at least one positive lens element on an image side of the negative lens element.

8. The zoom lens system according to claim 1, wherein the second lens unit includes, in order from an object side to an image side, a first negative lens element with a meniscus shape having a concave surface on the image side, a second negative lens element with a biconcave shape, a first positive lens element with a biconvex shape, and a third negative lens element with a biconcave shape, and wherein the first negative lens element is formed from a material that satisfies the first conditions.

9. The zoom lens system according to claim 1, wherein the second lens unit includes, in order from an object side to an image side, a first negative lens element with a meniscus shape having a concave surface on the image side, a second negative lens element with a biconcave shape, a first positive lens element with a biconvex shape, and a third negative lens element having a concave surface on the object side, and wherein the first negative lens element is formed from a material that satisfies the first conditions.

10. The zoom lens system according to claim 1, wherein the second lens unit includes, in order from an object side to an image side, a first negative lens element with a meniscus shape having a concave surface on the image side, a second negative lens element with a biconcave shape, and a positive lens element having a convex surface on the object side, and wherein the first negative lens element is formed from a material that satisfies the first conditions.

11. The zoom lens system according to claim 1, wherein the second lens unit includes, in order from an object side to an image side, a first negative lens element with a meniscus shape having a concave surface on the image side, a second negative lens element having a concave surface on the image side, a third negative lens element with a biconcave shape, and a positive lens element having a convex surface on the object side, and wherein the first negative lens element is formed from a material that satisfies the first conditions.

12. The zoom lens system according to claim 1, wherein the rear lens component includes, in order from an object side to an image side, a third lens unit having a positive optical power and a fourth lens unit having a positive optical power.

13. The zoom lens system according to claim 1, wherein the material that satisfies the first conditions is an inorganic material.

14. The zoom lens system according to claim 1, wherein the zoom lens system forms an image on a solid-state image pickup element.

15. A camera including:
   the zoom lens system according to claim 1; and
   a solid-state image pickup element configured to receive light of an image formed by the zoom lens system.

* * * * *